US008860687B2

(12) United States Patent
Mizuhashi et al.

(10) Patent No.: US 8,860,687 B2
(45) Date of Patent: Oct. 14, 2014

(54) DISPLAY, TOUCH PANEL AND ELECTRONIC DEVICE

(75) Inventors: Hiroshi Mizuhashi, Kanagawa (JP); Yasuo Takahashi, Tokyo (JP)

(73) Assignee: Japan Display, Inc., Chita (JP)

( * ) Notice: Subject to any disclaimer, the term of this patent is extended or adjusted under 35 U.S.C. 154(b) by 553 days.

(21) Appl. No.: 12/988,586

(22) PCT Filed: Feb. 8, 2010

(86) PCT No.: PCT/JP2010/051816
§ 371 (c)(1),
(2), (4) Date: Oct. 19, 2010

(87) PCT Pub. No.: WO2010/098199
PCT Pub. Date: Sep. 2, 2010

(65) Prior Publication Data
US 2011/0043483 A1     Feb. 24, 2011

(30) Foreign Application Priority Data

Feb. 27, 2009  (JP) ................................ 2009-044999

(51) Int. Cl.
*G06F 3/045* (2006.01)
*G06F 3/042* (2006.01)
*G06F 1/32* (2006.01)
*G06F 3/044* (2006.01)

(52) U.S. Cl.
CPC .............. *G06F 3/044* (2013.01); *G06F 3/042* (2013.01); *G06F 1/3262* (2013.01); *G06F 1/3203* (2013.01); *G06F 2001/13456* (2013.01)
USPC .............. 345/174; 345/87; 345/156; 345/173

(58) Field of Classification Search
USPC .......................... 345/173–178; 715/700, 863
See application file for complete search history.

(56) References Cited

U.S. PATENT DOCUMENTS 5,621,437 A * 4/1997 Jeong ............................. 345/173
5,719,592 A * 2/1998 Misawa ........................ 345/667
(Continued)

FOREIGN PATENT DOCUMENTS

CN          101266743        9/2008
JP          08-163392        6/1996
(Continued)

*Primary Examiner* — Christopher E Leiby
(74) *Attorney, Agent, or Firm* — Robert J. Depke; The Chicago Technology Law Group, LLC

(57) ABSTRACT

A display with a touch panel allowed to achieve high response performance while reducing power consumption is obtained. The display includes a plurality of display elements performing display based on picture signals supplied to a plurality of picture signal lines, respectively, a plurality of sensor elements outputting touch signals indicating detection of an external proximity object to a plurality of sensor signal lines (SGL), respectively, a detection section (a comparator 331) detecting each of the touch signals, a transfer output section (a D-type flip-flop 332 and an output buffer circuit 36) transferring and outputting a detection result of the detection section to outside, and a control section (a transistor switch SCW, a transfer clock control circuit 37 and a timing generator 35) controlling operations of the detection section and the transfer output section, allowing the transfer output section to operate in a case where the touch signal is detected in the detection section, and suspending an operation of the transfer output section in a case where the touch signal is not detected.

19 Claims, 21 Drawing Sheets

(56) References Cited

U.S. PATENT DOCUMENTS

| | | | |
|---|---|---|---|
| 6,509,851 B1* | 1/2003 | Clark et al. | 341/100 |
| 7,095,339 B2* | 8/2006 | Peng et al. | 341/26 |
| 2002/0190962 A1* | 12/2002 | Miura | 345/173 |
| 2003/0210235 A1* | 11/2003 | Roberts | 345/173 |
| 2005/0162410 A1* | 7/2005 | Johnson et al. | 345/174 |
| 2006/0284857 A1* | 12/2006 | Oh | 345/173 |
| 2007/0063991 A1* | 3/2007 | Lee et al. | 345/173 |
| 2008/0162996 A1* | 7/2008 | Krah et al. | 714/27 |
| 2008/0231564 A1 | 9/2008 | Harada et al. | |
| 2009/0058831 A1* | 3/2009 | Chen et al. | 345/174 |
| 2009/0167699 A1* | 7/2009 | Rosenblatt et al. | 345/173 |

FOREIGN PATENT DOCUMENTS

| | | |
|---|---|---|
| JP | 10-222285 A | 8/1998 |
| JP | 2008-262548 A | 10/2008 |
| JP | 2007-163891 | 6/2009 |

* cited by examiner

DISPLAY, TOUCH PANEL AND ELECTRONIC DEVICE

This application is a 371 U.S. National Stage filing of PCT/JP2010/051816, filed Feb. 8, 2010, which claims priority to Japanese Patent Application No. 2009-044999 filed Feb. 27, 2009, all of which are incorporated herein by reference.

TECHNICAL FIELD

The present invention relates to a touch panel detecting an external proximity object, a display and an electronic device including such a touch panel.

BACKGROUND ART

In recent years, attention has been given to a display in which a contact detection device so-called touch panel is mounted on a display such as a liquid crystal display and various buttons are displayed on the display so that information is allowed to be inputted by the buttons instead of normal buttons. In the display including such a touch panel, an input device such as a keyboard, a mouse or a keypad is not necessary, so there is a tendency to expand the use of the displays to portable information terminals such as cellular phones in addition to computers.

On the other hand, a reduction in power consumption of various electronic devices attracts attention in response to recent interest in ecology. In the display including the touch panel, a reduction in power consumption of not only a display panel but also the touch panel is desired. In particular, the touch panel is constantly in an activation state so that a touch is detectable whenever a touch operation is performed. As a result, the power consumption of the touch panel often reaches a considerable level. Therefore, various proposals have been made as a method of reducing the power consumption of the touch panel.

For example, PTL 1 discloses a display including a liquid crystal display panel which is integrated with an optical touch panel having two operation modes (a normal operation mode and a lower power consumption mode). For example, while a user inputs information by touching the touch panel, the touch panel operates in the normal operation mode, and when a touch is not detected for a predetermined period, the touch panel shifts to the low power consumption mode. In the low power consumption mode, power consumption is reduced by reducing the frequency of touch detection operations in the touch panel. After that, when a touch is detected in the low power consumption mode, the touch panel restores its operation mode from the low power consumption to the normal operation mode, and the user is allowed to input information again by touching the touch panel.

Moreover, for example, PTL 2 discloses a display including a liquid crystal display panel which is integrated with an optical touch panel having a normal operation mode and a low power consumption mode and reducing power consumption by reducing the frequency of touch detection operations in the low power consumption mode and setting, to a sleep state, only a circuit which performs a computation of a touch position.

CITATION LIST

Patent Literature

[PTL 1] Japanese Unexamined Patent Application Publication No. 2007-163891

[PTL 2] Japanese Unexamined Patent Application Publication No. 2008-262548

DISCLOSURE OF THE INVENTION

However, the displays disclosed in the above-described PTLs 1 and 2, in the low power consumption mode of the touch panel, the frequency of touch detection operations is reduced, so response speed of touch detection in the low power consumption mode may become slower to cause a decline in response performance as the whole touch panel. As a result, for example, in the case where a user touches a button displayed on the display, the user feels discomfort. In particular, in the case where a fine drawing is inputted from the touch panel with use of, for example, a stylus, due to low response characteristics, the user may feel inconvenience such as difficulty in inputting a fine drawing.

Therefore, it is desirable to provide a display, a touch panel and an electronic device which are allowed to achieve high response performance while reducing power consumption.

A display of the invention includes a plurality of display elements, a plurality of sensor elements, a detection section, a transfer output section and a control section. The plurality of display elements perform display based on picture signals supplied to a plurality of picture signal lines, respectively. The plurality of sensor elements output touch signals indicating detection of an external proximity object to a plurality of sensor signal lines, respectively. The detection section detects each of the touch signals. The transfer output section transfers and outputs a detection result of the detection section. The control section controls operations of the detection section and the transfer output section, allows the transfer output section to operate in a case where the touch signal is detected in the detection section and suspends the operation of the transfer output section in a case where the touch signal is not detected. Preferably, the above-described transfer detection section converts the detection result of the detection section from parallel data to serial data, and transfers and outputs the detection result.

A touch panel of the invention includes a plurality of sensor elements and a sensor detection circuit. The plurality of sensor elements outputs touch signals indicating detection of an external proximity object to a plurality of sensor signal lines, respectively. The sensor detection circuit detects an external proximity object based on the touch signals, and includes a detection section, a transfer output section and a control section. The detection section detects each of the touch signals. The transfer output section transfers and outputs a detection result of the detection section. The control section controls operations of the detection section and the transfer output section, allows the transfer output section to operate in a case where the touch signal is detected in the detection section, and suspends the operation of the transfer output section in a case where the touch signal is not detected. Preferably, the above-described transfer detection section converts the detection result of the detection section from parallel data to serial data, and transfers and outputs the detection result.

An electronic device of the invention includes the above-described display of the invention, and corresponds to, for example, a television, a digital camera, a notebook personal computer, a video camera, a portable terminal device such as a cellular phone, or the like.

In the display, the touch panel and the electronic device of the invention, the detection section detects the touch signal supplied from the touch sensor through the sensor signal line. At this time, the control section constantly monitors the presence or absence of the touch signal in the detection section, and only in the case where the touch signal is detected in the detection section, the transfer output section transfers and outputs a detection result to outside, and in the case where the touch signal is not detected, the transfer output section is controlled so as not to perform the operation. At this time, preferably, the detection section divides a whole touch detection region where the plurality of sensor elements are arranged into a plurality of regions, and sequentially detects the touch signal from one of the regions to another in a time-divisional manner, and the control section suspends the operation of the transfer output section in a period corresponding to a region, where the touch signal is not detected, in the plurality of regions.

In the display, the touch panel and the electronic device of the invention, for example, the control section may suspend a part of a detection operation of the detection section as well when the touch signal is not detected in the detection section for a predetermined period.

Moreover, for example, in the case where the detection section detecting the touch signal through sampling with predetermined frequency is used, the control section may reduce operation frequency in the detection section and the transfer output section when the touch signal is not detected in the detection section for a predetermined period. In this case, the control section may count number of frames in picture display, and may reduce operation frequency in the detection section and the transfer output section in a case where the touch signal is not detected in the detection section for a period of one or a plurality of frames, and when the touch signal is detected after that, the control section may reset a number count value in a count operation and may put the reduced operation frequency back to original operation frequency. More specifically, for example, the control section may be configured to shift to a first operation mode in a case where the touch signal is not detected in the detection section in a period of one or a plurality of frames, and to shift to a second operation mode in a case where the touch signal is detected thereafter, the first operation mode allowing the detection section and the transfer output section to operate at every predetermined number of frames, the second operation mode allowing the detection section and the transfer output section to operate at every frame.

In the display, the touch panel and the electronic device of the invention, for example, the sensor signal lines may be used as the picture signal lines, as well, and the display may include an initialization section simultaneously applying an initialization signal to all of the plurality of sensor signal lines in an initialization period, and the detection section may detect the touch signal in a period other than a picture signal application period, where the picture signals are applied to the sensor signal lines, in a period following the initialization period.

In this case, for example, the control section may be configured to include a control signal generation section generating an activation signal when the touch signal is detected in the detection section and generating a stop signal when an initialization signal by the initialization section is applied, and an operation signal control section controlling the generation of a transfer clock signal to be supplied to the transfer output section and a detection activation signal to be supplied to the detection section in response to the activation signal and the stop signal.

In the case where the sensor signal lines are used as the picture signal lines, as well as described above, for example, a liquid crystal display element and a contact type sensor element configured to commonly include a pixel electrode and a drive electrode are applicable. That is, the display element is a liquid crystal display element including a pixel electrode to which the picture signal is supplied, a drive electrode to which a common signal is supplied, the common signal being commonly supplied to the plurality of display elements, and a liquid crystal layer driven in response to a potential difference between a voltage of the pixel electrode and a voltage of the drive electrode. The sensor element is a contact type sensor element configured of the pixel electrode and the drive electrode. In this case, the detection section is allowed to detect a voltage change as the touch signal in the sensor signal line occurring when the pixel electrode and the drive electrode comes close to or in contact with each other by being pressed by an external proximity object.

In the case where the liquid crystal display element is used, for example, the liquid crystal display element may be configured to drive a liquid crystal in a manner of a polarity inversion drive where the polarity of the potential difference is inverted at every predetermined period. In this case, preferably, a signal based on the common signal of which the potential changes at every predetermined period above-mentioned is used as the initialization signal, and a logic gate circuit is inserted between the detection section and the control signal generation section, the logic gate circuit generating an effective logic of a detection result of the detection section based on the initialization signal and outputting the effective logic to the control signal generation section.

In the display, the touch panel and the electronic device of the invention, as the sensor element, for example, a capacitive type sensor element including an electrode which forms a capacitance and outputting a signal to the sensor signal line based on the capacitance which changes depending on an external proximity object may be used. Alternatively, the sensor element may be an optical type sensor element including a photosensitive element which detects light and outputs a signal according to an amount of the light, and outputting a signal to the sensor signal line based on an output signal from the photosensitive element, the output signal changing depending on an external proximity object. The display element may be, for example, an EL display element.

According to the display, the touch panel and the electronic device, the detection section constantly operate, and the operation of the transfer output section is controlled depending on a touch detection state, so high response performance is achievable while reducing power consumption.

BEST MODE(S) FOR CARRYING OUT THE INVENTION

Preferred embodiments of the invention will be described with use of a liquid crystal display as an example referring to the accompanying drawings. Descriptions will be given in the following order.
1. First Embodiment
2. Second Embodiment
3. Third Embodiment
4. Fourth Embodiment
5. Application Examples
6. Modification Examples

1. FIRST EMBODIMENT

Configuration Example

Whole Configuration Example

Figure 1:
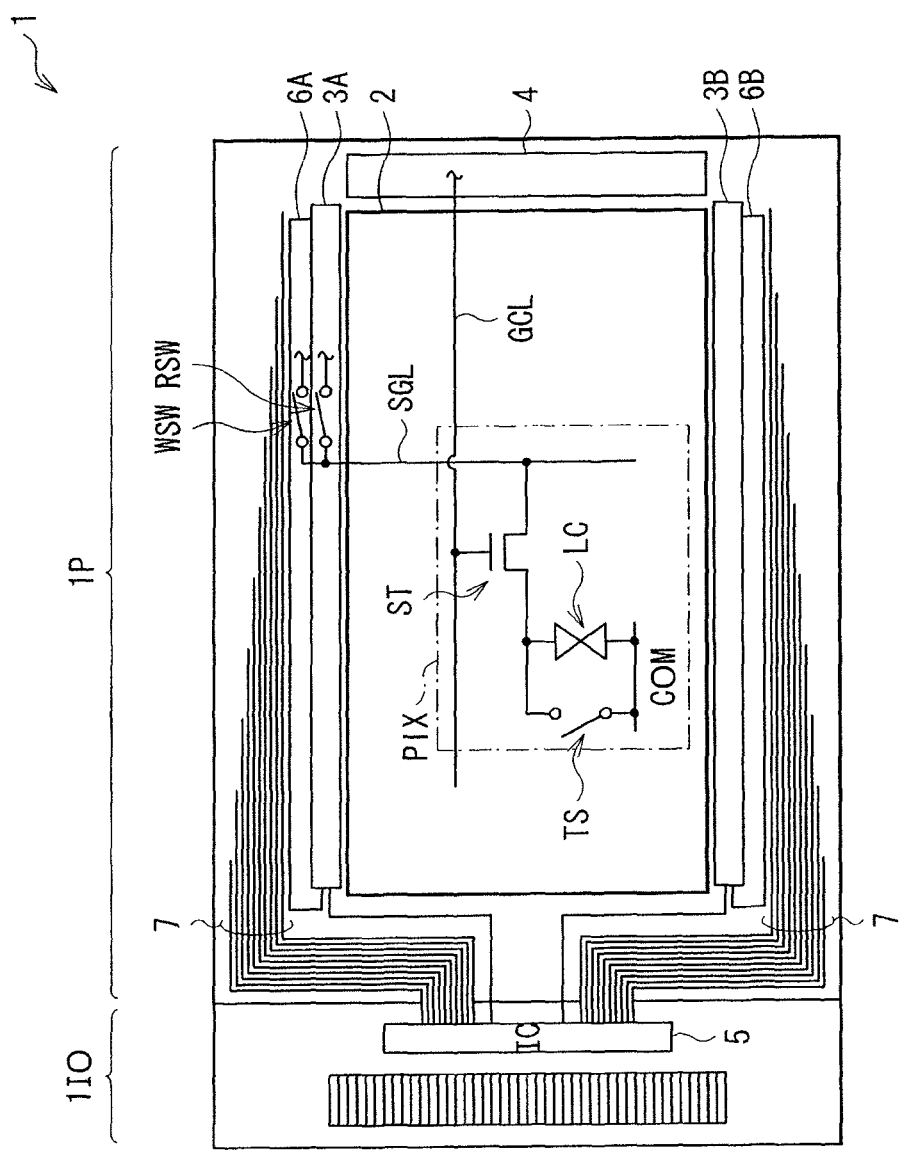
FIG. 1 is a schematic view illustrating a configuration example of a display according to a first embodiment of the invention.

FIG. 1 illustrates a configuration example of a display according to a first embodiment of the invention. A display 1 is a so-called in-cell display in which a display panel and a touch panel are integrated into one unit, and is configured by using a liquid crystal element as a display element and a contact type touch sensor as a touch sensor element.

The display 1 includes a display panel 1P and a panel interface section 1IO. The display panel 1P is a liquid crystal display panel, and displays a picture based on a picture signal supplied through the panel interface section 1IO. In FIG. 1, a region illustrated as the display panel 1P corresponds to the size of a drive substrate. The display panel 1P includes a display section 2, source drivers 6A and 6B, sensor readout circuits 3A and 3B and a vertical drive circuit 4. In addition, hereinafter, the source drivers 6A and 6B and the sensor readout circuits 3A and 3B are collectively called source driver 6, and sensor readout circuit 3, respectively, as necessary.

The display section 2 indicates a display region where display is actually performed, and a region illustrated as the display section 2 in FIG. 1 corresponds to the size of an opposed substrate facing the drive substrate. In the display section 2, pixels PIX are arranged in a matrix form. The pixels PIX each include a select transistor ST, a liquid crystal element LC and a touch sensor TS.

The select transistor ST is arranged on the drive substrate, and is configured of, for example, a TFT (Thin Film Transistor). In the select transistor ST, one of a source or a drain is connected to a signal line SGL (which will be described later), and the other is connected to a pixel electrode (not illustrated) to drive the liquid crystal element LC, and is also connected to the touch sensor TS. A gate of the select transistor ST is connected to a gate control line (which will be described later).

The liquid crystal element LC is a display element performing display based on a signal (a pixel signal) supplied from the source driver 6 (which will be described later) through the select transistor ST. More specifically, the liquid crystal element LC performs display based on a potential difference between a pixel signal supplied to the pixel electrode and a common drive signal COM supplied to a common electrode commonly arranged for all pixels. Herein, the common drive signal COM is a DC signal, and in this example, the DC voltage of the common drive signal COM is 0 V.

In FIG. 1, a liquid crystal is injected between the opposed substrate (corresponding to the display section 2) and the drive substrate (corresponding to the display panel 1P) to form a liquid crystal layer. The thickness of the liquid crystal layer is kept constant by a spacer. Moreover, an outer peripheral side surface of a region between the substrates is enclosed with a sealing agent so as to prevent leakage of the liquid crystal. A color filter or the like is formed on the opposed substrate in advance, and at this time, a protective layer is formed on a surface of the opposed substrate. By this configuration, the liquid crystal element LC modulates the liquid crystal layer in response to the state of an electric field formed based on a potential difference between the pixel electrode and the common electrode (both not illustrated) to modulate the light amount of light passing therethrough.

The touch sensor TS outputs a touch signal indicating detection of an external proximity object, and supplies the touch signal to the sensor readout circuit 3 (which will be described later) through the select transistor ST. Typically, touch sensors are broadly divided into a resistive type, a capacitive type and an optical type. In applications of the present invention, any type of touch sensor is used. However, in the embodiment, for convenience of description, it is assumed that a type in which a potential change in the signal line SGL occurs in response to contact with (or proximity to) a panel surface, for example, a resistive switch type or the like is used. In the resistive switch type, a switch of the touch sensor TS illustrated in FIG. 1 turns on by a touch operation on the panel surface. Thereby, a charge/discharge path of an electric charge is formed in the signal line SGL (resistance of the charge/discharge path is changed) to cause a voltage change in the signal line SGL. The sensor readout circuit 3 (which will be described later) reads out the voltage change to detect a touch. The type has advantages of high integration between the liquid crystal panel and a sensor configuration section and minimization of additional processes by addition of a sensor function.

As a specific example of the touch sensor TS, for example, in a liquid crystal mode such as TN (Twisted Nematic), VA (Vertical Alignment) and ECB (Electrically Controlled Birefringence) in which a pixel electrode and a common electrode are formed on the drive substrate and the opposed substrate, respectively, a contact type touch sensor which configures a contact type switch of a pixel electrode and a common electrode facing the pixel electrode and uses resistance between the pixel electrode (a switch electrode) and the common electrode is applicable. That is, in the case where the contact type touch sensor is used, as a result of being pressed by the external proximity object, the pixel electrode (the switch electrode) and the common electrode comes into contact with each other in a pixel corresponding to a position where the external proximity object touches, and the touch sensor TS outputs a signal in response to the contact.

In addition, each of the pixels PIX may not necessarily include the touch sensor TS. That is, for example, one touch sensor TS may be allocated to every two or more pixels PIX in a horizontal direction in FIG. 1, and, for example, one touch sensor TS may be allocated to every two or more pixels PIX in a vertical direction in FIG. 1.

Each of the pixels PIX arranged in a matrix form in the display section 2 is connected to a gate control line GCL and the signal line SGL. That is, the gate control line GCL is connected to the gate of the select transistor ST of the pixel PIX, and is laid in the horizontal direction in FIG. 1, and is connected to the vertical drive circuit 4 outside the display section 2. The signal line SGL is connected to one of the source and the drain of the select transistor ST of the pixel PIX, and is laid in the vertical direction in FIG. 1, and is connected to the source drivers 6 and the sensor readout circuits 3 outside the display section 2. In FIG. 1, two sensor readout circuits 3 and two source drivers 6 are arranged in consideration of symmetry of a frame region of the display 1, or the like. By the configuration, the gate control line GCL is used in both of a display operation and a touch detection operation, and the signal line SGL is also used in both of the display operation and the touch detection operation. In other words, the display 1 is allowed to perform the touch detection operation by sharing the use of the (picture) signal line SGL and the gate control line GCL which are typically used in the display operation.

The above-described select transistors ST, electrodes (not illustrated) such as a pixel electrode or a retention capacity electrode, lines such as the signal line SGL or the gate control line GCL are regularly formed on the drive substrate. The common electrode is formed on the opposed substrate in the liquid crystal mode such as TN, VA or ECB, and the common electrode is formed on the drive substrate in a lateral-field liquid crystal mode such as FFS (fringe-field switching) or IPS (in-plane switching). They are formed by a TFT process and a multilayer wiring process. In the multilayer wiring process, wiring of approximately one or two layers is often formed in terms of cost.

The source driver 6 is a circuit supplying a signal for display (a pixel signal) to the liquid crystal element LC. More specifically, the source driver 6 has a function of generating a pixel signal based on a signal supplied from an IC 5 (which will be described later) through a picture signal input line 7 to supply the pixel signal to the liquid crystal element LC through the signal line SGL.

Moreover, the source driver 6 has a function of applying a predetermined voltage (a precharge voltage PRE) to the signal line SGL in advance of the touch detection operation and the display operation. More specifically, as will be described later, the source driver 6 applies the precharge voltage PRE to the signal line SGL in response to a precharge signal Pre supplied from a timing generator 35 of the sensor readout circuit 3. In the touch detection operation performed subsequent to a precharge operation, a voltage Sig of the signal line SGL is detected, and the sensor readout circuit 3 detects a touch based on a voltage change from the predetermined precharge voltage PRE. In the display operation subsequent to the touch detection operation, the precharge voltage PRE is applied to the signal line SGL in advance, so the pixel signal is easily applied to the signal line SGL, thereby to easily perform the display operation.

The source driver 6 and the signal line SGL are connected to each other through a writing switch WSW. The on/off operation of the writing switch WSW is controlled by a select signal SEL (not illustrated). The writing switch WSW is controlled so as to turn on in a period where the signal line SGL is used for the display operation (a picture signal application period) and a period where the precharge operation is performed (a precharge period), and to turn off in a period where the signal line SGL is used for the touch detection operation (a touch detection period).

In addition, in FIG. 1, a large number of picture signal output lines 7 are arranged between each of the source drivers 6 and the IC 5 (which will be described later). If a horizontal drive circuit is formed in the display panel 1P, the number of the signal output lines may be reduced.

The sensor readout circuit 3 is a circuit detecting a touch based on a touch signal supplied from the touch sensor TS. More specifically, as will be described later, the sensor readout circuit 3 has a function of detecting touch signals supplied from the touch sensors TS (in one horizontal line) selected by the vertical drive circuit 4 through the signal line SGL to determine whether or not the touch is made in each of the touch sensors TS. The sensor readout circuit 3 and the signal line SGL are connected to each other through a readout switch RSW. The readout switch RSW is controlled so as to turn on in the period where the signal line SGL is used for the touch detection operation (the touch detection period).

Moreover, as will be described later, in the case where a touch detection result for the one horizontal line indicates that a touch is made, the sensor readout circuit 3 performs parallel-to-serial conversion on the touch detection result to transfer the touch detection result to the IC 5 (which will be described later). Such a parallel-to-serial conversion operation and such a transfer operation are only performed when a touch is detected, so a reduction in power consumption is allowed. At this time, a touch detection operation is constantly performed, so a response to a touch is not delayed. That is, when the sensor readout circuit 3 is used, the display 1 is allowed to achieve high response performance while reducing power consumption.

Introduction of a parallel-to-serial conversion function is effective at downsizing the display panel 1P because of the following reason. A number equal to the number of pixels in a display row direction (the horizontal direction in FIG. 1) of the signal lines SGL, that is, several hundred to several thousand signal lines SGL are arranged. Therefore, as described above, even if the touch sensors TS are arranged so that one touch sensor TS is allocated to, for example, every two pixels PIX in the horizontal direction in FIG. 1, the number of lines supplied to the sensor readout circuit 3 in the signal lines SGL are still large. The sensor readout circuit 3 is allowed to reduce the number of output lines to one line (or a few lines) by having the parallel-to-serial conversion function, and is allowed to remarkably reduce the number of lines between the display panel 1P and the IC 5. Thereby, the area of the frame of the display panel 1P is allowed to be reduced, and an increase in the size of the IC 5 is preventable by reducing the number of lines.

The vertical drive circuit 4 has a function of selecting a pixel PIX to be subjected to the touch detection operation and the display operation. More specifically, the vertical drive circuit 4 applies a writing enable pulse ENB to the gate control line GCL to select the pixels PIX in one row (one horizontal line) from the pixels PIX formed in a matrix form in the display section 2. In the touch detection period, touch signals are outputted from the touch sensors TS of the selected pixels PIX and are detected in the sensor readout circuit 3, thereby touch detection is performed on the one horizontal line. Moreover, in the picture signal application period, the pixel signal is outputted from the source driver 6 to be supplied to the liquid crystal display elements LC of the selected pixels PIX, thereby display is performed on the one horizontal line. Thus, the vertical drive circuit 4 performs sequential-scanning from one horizontal line to another in a time-divisional manner, and controls the display 1 to perform the touch detection operation and the display operation.

A line group from the display panel 1P is connected to the IC 5 of the panel interface section 110 through a flexible substrate or the like. The IC 5 is a circuit driving the display panel 1P or performing signal processing. Although not specifically illustrated, the IC 5 is connected to an input/output pin to exchange a signal with a component outside the display 1 through the input/output pin. A signal which is supplied from the sensor readout circuit 3 and includes information about whether or not a touch is made is transferred to the component outside the display 1 to be used as a signal for starting execution of a predetermined process or a specific command in an electronic device including the display.

(Sensor Readout Circuit 3)

Next, the sensor readout circuit 3 will be described in detail below.

Figure 2:
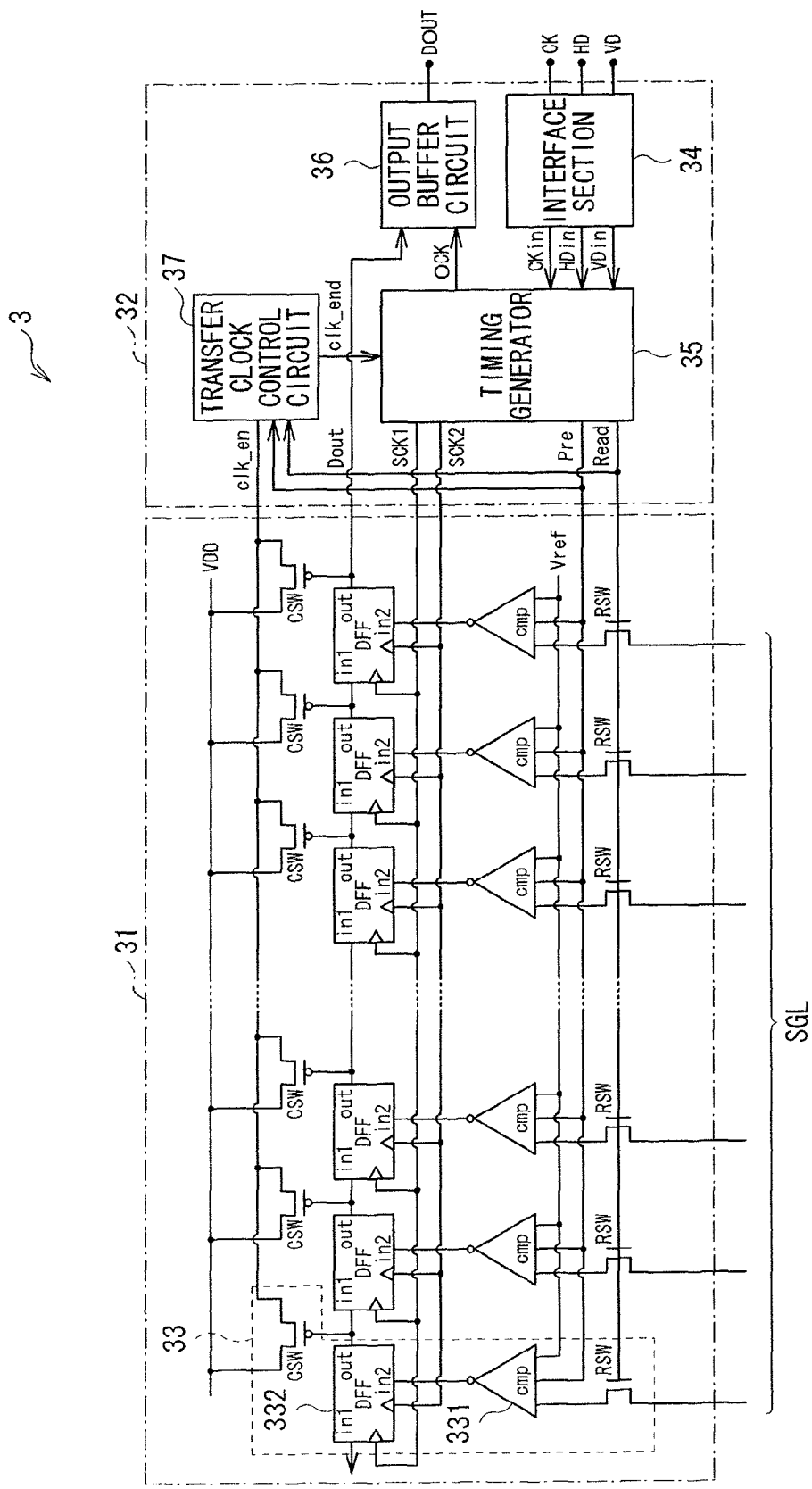
FIG. 2 is a block diagram illustrating a configuration example of a sensor readout circuit illustrated in FIG. 1.

FIG. 2 illustrates a circuit configuration example of the sensor readout circuit 3. The sensor readout circuit 3 includes an operation section 31 performing readout of a sensor output and parallel-to-serial conversion and a control IO section 32 controlling the operation section 31 and functioning as an interface to outside.

The operation section 31 includes a plurality of readout transfer units 33 serially connected to one another. Each of the readout transfer units 33 includes a readout switch RSW, a comparator (cmp) 331, a D-type flip-flop (DFF) 332 and a transistor switch CSW.

In the readout switch RSW, one of a source and a drain is connected to the signal line SGL, and the other is connected to a first input terminal (which will be described later) of the comparator 331. A read signal Read outputted from a timing generator 35 (which will be described later) of the control IO section 32 is supplied to a gate of the readout switch RSW. By the configuration, when the read signal Read is in a "H" level, the readout switch RSW turns on to supply a signal of the signal line SGL to the first input terminal (which will be described later) of the comparator 331.

The comparator 331 is a circuit comparing between voltage levels of signals supplied to two input terminals. The first input terminal is connected to the other of the source and the drain of the readout switch RSW, and a reference voltage Vref is supplied to a second input terminal. The comparator 331 is activated by a precharge signal Pre from the timing generator 35 (which will be described later). That is, the comparator 331 is activated so as to adopt the reference voltage Vref supplied from the second input terminal as a threshold value in the case where the precharge signal Pre is in a "H" level, and to compare the voltage of the first input terminal with the adopted threshold value in the case where the precharge signal Pre is in a "L" level. By the configuration, as will be described later, when the comparator 331 is activated, the comparator 331 outputs a logic "H" in the case where the voltage of the first input terminal (the voltage of the signal line SGL) is lower than the voltage of the second input terminal (the reference voltage Vref), and outputs a logic "L" in the case where the voltage of the first input terminal (the voltage of the signal line SGL) is higher than the voltage of the second input terminal (the reference voltage Vref). That is, the comparator 331 outputs the logic "H" in the case where the touch sensor TS detects a touch, and outputs the logic "L" in the case where the touch sensor TS does not detect a touch. That is, the output logic of the comparator 331 is high active.

The D-type flip-flop 332 is a circuit including a first input terminal in1 and a second input terminal in2 and retaining signals supplied to the two terminals and outputting the signals from an output terminal out. The first input terminal in1 of the D-type flip-flop 332 of one readout transfer unit 33 is connected to an output terminal of the D-type flip-flop of the preceding readout transfer unit 33 serially connected to the one D-type flip-flop 332, and the second input terminal in2 is connected to the output terminal of the comparator 331.

Figure 3:
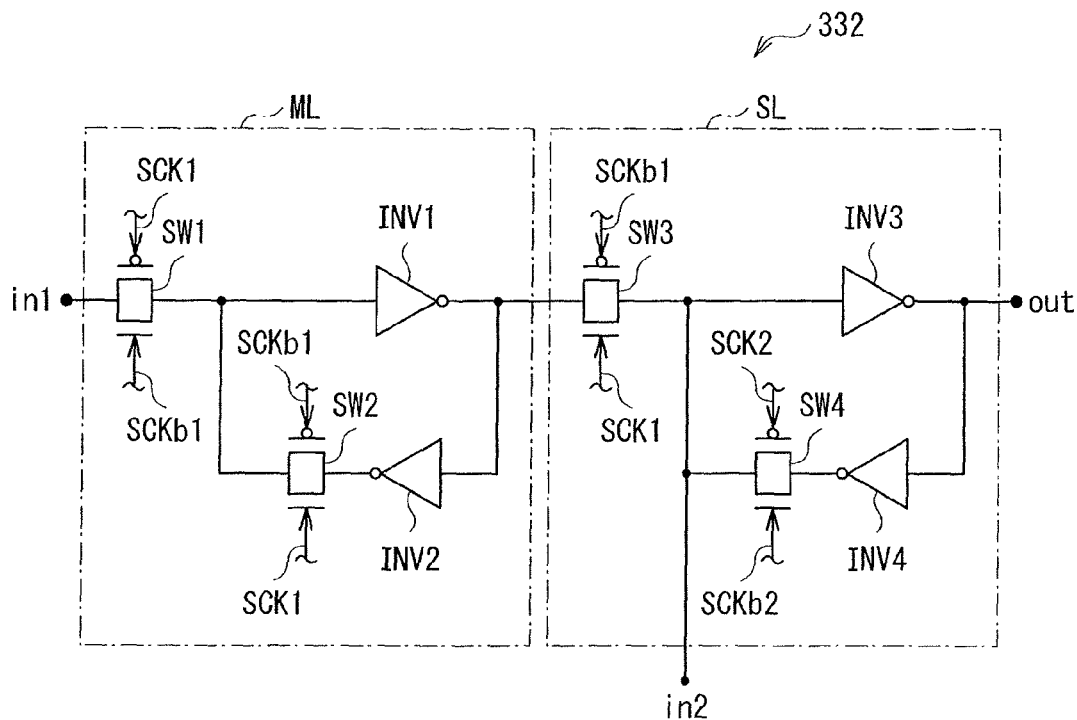
FIG. 3 is a circuit diagram illustrating a configuration example of a D-type flip-flop (DFF) illustrated in FIG. 2.

FIG. 3 illustrates a circuit configuration example of the D-type flip-flop 332. The D-type flip-flop 332 includes four inverters INV1 to INV4 and four transfer gate type switches SW1 to SW4. The switch SW1 is inserted between the first input terminal in1 and an input terminal of the inverter INV1, and the on/off operation of the switch SW1 is controlled by a first transfer clock SCK1 and a first inverted transfer clock SCKb1. An input terminal of the inverter INV1 is connected to one terminal of the switch SW1, and the inverter INV1 is a circuit inverting and outputting an input signal. An input terminal of the inverter INV2 is connected to an output terminal of the inverter INV1, and the inverter INV2 is a circuit inverting and outputting an input signal. The switch SW2 is inserted between an output terminal of the inverter INV2 and the input terminal of the inverter INV1, and the on/off operation of the switch SW2 is controlled by the first inverted transfer clock SCKb1 and the first transfer clock SCK1. The switch SW3 is inserted between the output terminal of the inverter INV1 and an input terminal of the inverter INV3, and the on/off operation of the switch SW3 is controlled by the first inverted transfer clock SCKb1 and the first transfer clock SCK1. An input terminal of the inverter INV3 is connected to one terminal of the switch SW3 and the second input terminal in2, and the inverter INV3 is a circuit inverting an input signal to output the input signal as an output signal of the D-type flip-flop 332. An input terminal of the inverter INV4 is connected to an output terminal of the inverter INV3, and the inverter INV4 is a circuit inverting and outputting an input signal. The switch SW4 is inserted between an output terminal of the inverter INV4 and the input terminal of the inverter INV3, and the on/off operation of the switch SW4 is controlled by a second transfer clock SCK2 and a second inverted transfer clock SCKb2. In this case, the first inverted transfer clock SCKb1 is generated by inverting the first transfer clock SCK1 by an inverter for first transfer clock (not illustrated). Moreover, the second inverted transfer clock SCKb2 is generated by inverting the second transfer clock SCK2 by an inverter for second transfer clock (not illustrated).

In the D-type flip-flop 332, the switch SW1 and the switch SW2 operate exclusively with each other. That is, when the switch SW1 turns on, the switch SW2 turns off, and when the switch SW1 turns off, the switch SW2 turns on. Likewise, the switch SW1 and the switch SW3 operates exclusively with each other. That is, when the switch SW1 turns on, the switch SW3 turns off, and when the switch SW1 turns off, the switch SW3 turns on.

By the above configuration, in the D-type flip-flop 332, the inverters INV1 and INV2 and the switches SW1 and SW2 configure a master latch ML, and the inverters INV3 and INV4 and the switches SW3 and SW4 configures a slave latch SL.

As described above, the readout transfer units 33 are serially connected to one another in the operation section 31. That is, as illustrated in FIG. 2, the output terminal of the D-type flip-flop 332 of a given readout transfer unit 33 is connected to the first input terminal of the D-type flip-flop 332 of a readout transfer unit 33 subsequent to the given readout transfer unit 33. A plurality of D-type flip-flops 332 which are serially connected to one another configure a shift register, and execute parallel-to-serial conversion. More specifically, first, a deactivation logic "H" is provided from an external controller to the input terminal in1 of a first D-type flip-flop 332. Each of the D-type flip-flops 332 rewrites retained data of the slave latch SL in response to a voltage supplied from the output terminal of the comparator 331 to the second input terminal. That is, when a touch sensor TS detects a touch, the output of the comparator 331 corresponding to the touch sensor TS is a logic "H", and the logic is retained in the slave latch SL of the D-type flip-flop 332, and the D-type flip-flop 332 outputs a logic "L" corresponding to a logic inverted from the output logic of the comparator 331. Moreover, when a touch sensor does not detect a touch, the output of the comparator 331 corresponding to the touch sensor is a logic "L", and the logic is retained in the slave latch SL of the D-type flip-flop 332, and the D-type flip-flop 332 outputs a logic "H" corresponding to a logic inverted from the output logic of the comparator 331. That is, the output logic of the D-type flip-flop 332 is low active. Thus, a bit string which is outputted from a plurality of signal lines SGL and indicates whether or not a touch is made is retained in the shift register. After that, the shift register performs parallel-to-serial conversion on the bit string in synchronization with the first transfer clock SCK1 and the second transfer clock SCK2, and outputs the bit string as a sensor output transfer signal Dout from the output terminal out of a last D-type flip-flop 332.

In the transistor switch CSW, a gate is connected to the output terminal out of the D-type flip-flop 332, and one of a drain and a source is connected to a power supply VDD (corresponding to a logic "H"), and the other is connected to an input terminal for a clock control permission signal clk_en of a transfer clock control circuit 37 of the control JO section 32. In this example, a signal used in the D-type flip-flop 332 is a low active signal, so the transistor switch CSW has a PMOS configuration. That is, when an activation logic "L" is applied to a gate of the transistor switch CSW, the transistor switch CSW turns on, and the activation logic "H" corresponding to the power supply VDD is supplied to the transfer clock control circuit 37 as the clock control permission signal clk_en (which will be described later). One transistor switch CSW is arranged in each readout transfer unit 33, and all transistor switches CSW are connected to the input terminal for the clock control permission signal clk_en of the transfer clock control circuit 37. By the configuration, even if only one of the plurality of D-type flip-flops 332 outputs the activation logic "L", a corresponding transistor switch CSW turns on, and the activation logic "H" is supplied to the transfer clock control circuit 37 as the clock control permission signal clk_en (which will be described later).

The control IO section 32 includes an interface section 34, the timing generator 35, an output buffer circuit 36 and the transfer clock control circuit 37.

The interface section 34 is an input interface circuit inputting a signal, which is supplied from outside, for controlling the sensor readout circuit 3. More specifically, the interface section 34 generates a clock signal CKin based on a clock signal CK, which is supplied from outside, for sensor readout, a horizontal synchronization signal HDin based on a horizontal synchronization signal HD supplied from outside, and a vertical synchronization signal VDin based on a vertical synchronization signal VD supplied from outside to supply these signals to the timing generator 35.

The timing generator 35 is a circuit cooperating with the transfer clock control circuit 37 (which will be described later) and generating a signal for controlling a touch sensor detection operation and a parallel-to-serial conversion operation in the operation section 31. More specifically, the timing generator 35 has a function of generating the first transfer clock SCK1 and the second transfer clock SCK2, the read signal Read, and the precharge signal Pre based on the clock signal CKin, the horizontal synchronization signal HDin and the vertical synchronization signal VDin supplied from the interface section 34, and supplying these signals to the readout transfer unit 33 of the operation section 31 and supplying the read signal Read and the precharge signal Pre to the transfer control circuit 37 (which will be described later). Moreover, although not illustrated, the timing generator 35 also supplies the precharge signal Pre to the source driver 6.

The transfer clock control circuit 37 is a circuit controlling the parallel-to-serial conversion operation in the operation section 31 in response to the clock control permission signal clk_en supplied from the transistor switch CSW of the operation section 31. More specifically, when a touch is detected in the touch detection operation on one horizontal line, and the activation logic "H" is supplied as the clock control permission signal clk_en from the transistor switch CSW, the transfer clock control circuit 37 generates a clock stop signal clk_end, and supplies the clock stop signal clk_end to the timing generator 35. As will be described later, the timing generator 35 controls the first transfer clock SCK1 and the second transfer clock SCK2 in response to the clock stop signal clk_end supplied from the transfer clock control circuit 37 to control the operation of the shift register of the operation section 31. Further, the transfer clock control circuit 37 also has a function of resetting the clock control permission signal clk_en by setting the clock control permission signal clk_en to the deactivation logic "L" when the activation logic "H" as the precharge signal Pre is inputted from the timing generator 35.

Figure 4:
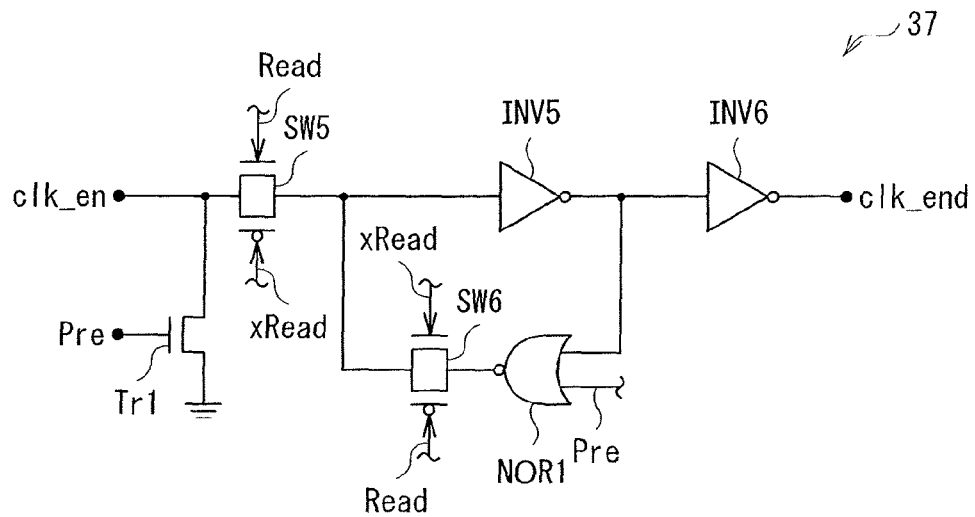
FIG. 4 is a circuit diagram illustrating a configuration example of a transfer clock control circuit 37 illustrated in FIG. 2.

FIG. 4 illustrates a circuit configuration example of the transfer clock control circuit 37. The transfer clock control circuit 37 includes a transistor Tr1, transfer gate type switches SW5 and SW6 and inverters INV5 and INV6, and a NOR circuit NOR1. In the transistor Tr1, the clock control permission signal clk_en is supplied to one of a drain and a source, and the other is grounded, and the precharge signal Pre is supplied to a gate. In the switch SW5, the clock control permission signal clk_en is supplied to one terminal, and the other terminal of the switch SW5 is connected to an input terminal of the inverter INV5, and the on/off operation of the switch SW5 is controlled by the read signal Read and an inverted read signal xRead. In the inverter INV5, an input terminal is connected to the other terminal of the switch SW5, and the inverter INV5 is a circuit inverting and outputting an input signal. In the NOR circuit NOR1, a first input terminal is connected to an output terminal of the inverter INV5, and the precharge signal Pre is supplied to a second input terminal, and an output terminal of the NOR circuit NOR1 is connected to one terminal of the switch SW6, and the NOR circuit NOR1 generates and outputs a NOR of the signals supplied to the first and second input terminals. The switch SW6 is inserted between the output terminal of the NOR circuit NOR1 and the input terminal of the inverter INV5, and the on/off operation of the switch SW6 is controlled by the inverted read signal xRead and the read signal Read. An input terminal of the inverter INV6 is connected to an output terminal of the inverter INV5, and the inverter INV6 is a circuit inverting an input signal and outputting the inverted input signal as an output signal (the clock stop signal clk_end) of the transfer clock control circuit 37. In this case, the inverted read signal xRead is generated by inverting the read signal Read by an inverter for read signal (not illustrated).

In the transfer clock control circuit 37, the switch SW5 and the switch SW6 operate exclusively with each other. That is, when the switch SW5 turns on, the switch SW6 turns off, and when the switch SW5 turns off, the switch SW6 turns on.

By the above-described configuration, in the transfer clock control circuit 37, the inverter INV5, the NOR circuit NOR1, and the switches SW5 and SW6 configure a latch circuit. In a latch operation of the latch circuit, when the precharge signal Pre is supplied to the NOR circuit NOR1, the transfer clock control circuit 37 functions to permit a latch input in synchronization with the precharge signal Pre. In the transfer clock control circuit 37, when the activation logic "H" is supplied to the gate of the transistor Tr1 as the precharge signal Pre, the clock control permission signal clk_en is reset to the deactivation logic "L".

The output buffer circuit 36 is a buffer circuit supplying the sensor output transfer signal Dout outputted from the shift register of the operation section 31 to the IC 5 of the panel interface section 1IO.

Herein, the display panel 1P corresponds to a specific example of "display" in the invention. The touch sensor TS corresponds to a specific example of "sensor element" in the invention. The liquid crystal element LC corresponds to a specific example of "display element" in the invention. The pixel electrode and the common electrode correspond to specific examples of "pixel electrode" and "drive electrode" in the invention. The signal line SGL corresponds to a specific example of "picture signal line" in the invention, and the pixel signal corresponds to a specific example of "picture signal" in the invention.

The comparator 331 corresponds to a specific example of "detection section" in the invention. The D-type flip-flop 332 and the output buffer circuit 36 correspond to specific examples of "transfer output section" in the invention. The transistor switch CSW, the transfer clock control circuit 37 and the timing generator 35 correspond to specific examples of "control section" in the invention. Among them, the transistor switch CSW corresponds to a specific example of "control signal generation section" in the invention, and the timing generator 35 corresponds to a specific example of "operation signal control section" in the invention.

The precharge voltage PRE corresponds to a specific example of "initialization signal" in the invention, and a circuit supplying the precharge voltage PRE to the signal line SGL corresponds to a specific example of "initialization section" in the invention.

(Operations and Functions)

Next, operations and functions of the display 1 according to the embodiment will be described below.

(Brief Description of Whole Operation)

In the display operation, first, the source driver 6 generates a pixel signal based on a picture signal supplied from the IC 5 and supplies the pixel signal to the display section 2 through the signal line SGL in the picture signal application period. The vertical drive circuit 4 selects the pixels PIX configuring one horizontal line in the display section 2 by driving the gate control line GCL. The display section 2 performs display on the one horizontal line based on the pixel signal of the signal line SGL and the voltage of the gate control line GCL. In the display section 2, sequential-scanning is performed from one horizontal line to another in a time-divisional manner, thereby display is performed on the whole display section 2.

In the touch detection operation, first, the source driver 6 applies a precharge voltage to the signal line SGL in response to the precharge signal Pre supplied from the timing generator 35. The touch sensors TS configuring one horizontal line selected by the vertical drive circuit 4 output touch signals indicating detection of an external proximity object to the signal lines SGL, respectively. The operation section 31 of the sensor readout circuit 3 detects a touch based on a voltage change in the voltage Sig of the signal line SGL. In the case where a touch is detected by a touch detection result for the one horizontal line, the operation section 31 performs parallel-to-serial conversion on the touch detection result. The transfer clock control circuit 37 controls the timing generator 35 so that the operation section 31 performs parallel-to-serial conversion in the case where a touch is detected in the touch detection result for the one horizontal line and does not perform parallel-to-serial conversion in the case where a touch is not determined. The interface section 34 inputs a control signal, which is supplied from outside, to the sensor readout circuit 3. The output buffer circuit 36 supplies, to the IC 5, the sensor output transfer signal Dout which is subjected to the parallel-to-serial conversion in the operation section 31 and outputted. In the display section 2, the touch detection is performed on the whole display section 2 by performing sequential-scanning from one horizontal line to another in a time-divisional manner.

(Touch Detection Operation in Sensor Readout Circuit 3)

Next, the touch detection operation in the sensor readout circuit 3 will be described in detail below.

Figure 5:
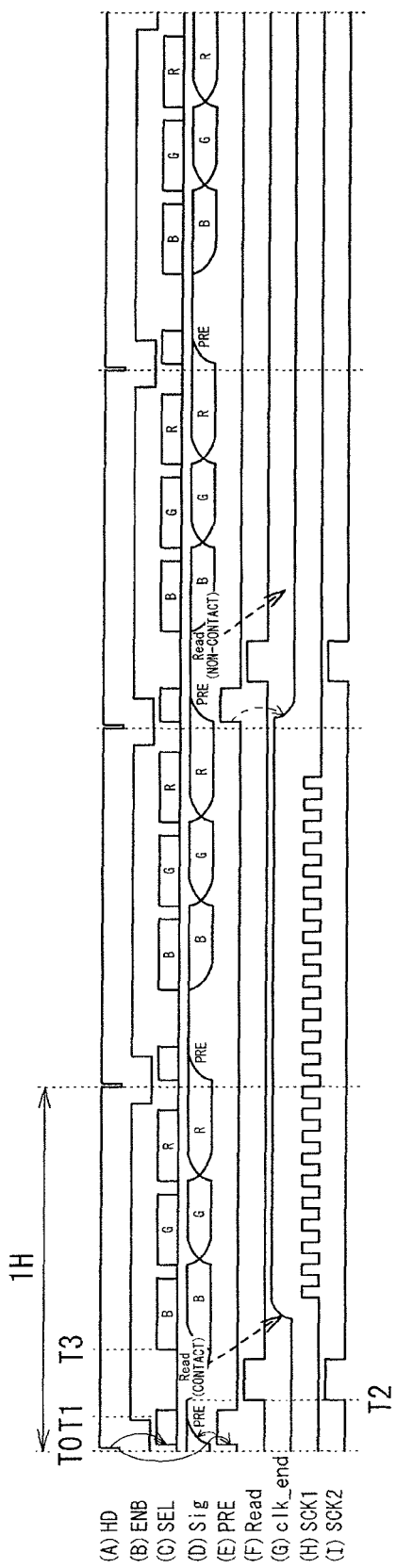
FIG. 5 is a timing waveform diagram illustrating an operation example of the display illustrated in FIG. 2.

FIG. 5 illustrates an example of a timing waveform diagram of the display 1, and (A) indicates a waveform of the horizontal synchronization signal HD, (B) indicates a waveform of the writing enable pulse ENB, (C) indicates a waveform of the select signal SEL, (D) indicates a waveform of the voltage Sig of the signal line SGL, (E) indicates a waveform of the precharge signal Pre, (F) indicates a waveform of the read signal Read, (G) indicates a waveform of the clock stop signal clk_end, (H) indicates a waveform of the transfer clock SCK1, and (I) indicates a waveform of the transfer clock SCK2. A left-half part of FIG. 5 indicates an operation in the case where a touch is made, and a right-half part of FIG. 5 indicates an operation in the case where a touch is not made. For convenience of description, in the pixels PIX, it is assumed that one touch sensor TS is allocated to every two pixels PIX in the horizontal direction in FIG. 1, and one touch sensor TS is allocated to every two pixels PIX in the vertical direction in FIG. 1. That is, in a two-dimensional plane, the case where one touch sensor TS is allocated to every 4 pixels is assumed. In addition, the horizontal synchronization signal HD defines one horizontal line period (1H).

Hereinafter, the left-half part of FIG. 5, that is, the operation in the case where a touch is made will be described in detail referring to, as necessary, the right-half part (the operation in the case where a touch is not made) of FIG. 5 for comparison.

As illustrated in FIG. 5, first, the display 1 performs a precharge operation from a timing T0 to a timing T1. Next, the display 1 performs the touch detection operation on one horizontal line from a timing T2 to a timing T3, and after that, the display 1 performs the parallel-to-serial conversion on a detection result of the touch detection operation in response to a transfer clock SCK to output the detection result. Then, the display 1 performs the display operation from the timing T3 onward.

Herein, a period from the timings T0 to T1 corresponds to a specific example of "initialization period" in the invention, and a period from the timing T3 onward corresponds to a specific example of "picture signal application period" in the invention.

First, in the sensor readout circuit 3, at the timing T0, the horizontal synchronization signal HD rises (refer to FIG. 5(A)) to start one horizontal line period. The timing generator 35 generates the precharge signal Pre as a positive pulse having a predetermined duration in synchronization with the timing T0 (refer to FIG. 5(E)). The precharge signal Pre is supplied to the comparator 331 and the transfer clock control circuit 37. When the precharge signal Pre turns to an "H" level, the comparator 331 adopts the reference voltage Vref applied to the second input terminal as a threshold value of a comparison operation. In the transfer clock control circuit 37, as illustrated in FIG. 4, when the precharge signal Pre turns to the "H" level, the transistor Tr1 turns on, and the clock control permission signal clk_en as an input signal of the transfer clock control circuit 37 is reset (set to the logic "L"). Moreover, the transfer clock control circuit 37 is latched by inputting the precharge signal Pre to the NOR circuit NOR1, and the clock stop signal clk_end as an output signal of the transfer clock control circuit 37 is set to the logic "L" to be reset.

Although not illustrated, the precharge signal Pre is also supplied to the source driver 6. In the source driver 6, the select signal SEL turns to the "H" level in response to the precharge signal Pre for a predetermined short period from the timing T0 to the timing T1 (refer to FIG. 5(C)). Thereby, the writing switch WSW turns on, and the voltage Sig of the signal line SGL is set to the precharge voltage PRE (a DC voltage in the "H" level) (refer to FIG. 5(D)).

Next, in the sensor readout circuit 3, at the timing T1, the precharge signal Pre falls (refer to FIG. 5(E)), and the application of the precharge voltage PRE to the signal line SGL is finished, the precharge voltage PRE starts to fall (refer to FIG. 5(D)). It is because an electric charge charged between the pixel electrode (the switch electrode) and the common electrode by the precharge operation is discharged through the touch sensor TS which turns on by being pressed by an external proximity object. That is, the touch sensor TS is a discharge path for the electric charge. On the other hand, in the right-half part of FIG. 5, a decline in the precharge voltage PRE is not observed. It is because a touch is not made, so the touch sensor TS does not turn on, and the discharge path for the electric charge is not formed. Moreover, when the precharge signal Pre turns to the "L" level, the comparator 331 starts a comparison operation between the voltage of the first input terminal and the threshold value (the reference voltage Vref).

Next, in the sensor readout circuit 3, at the timing T2, the read signal Read rises (refer to FIG. 5(F)). Thereby, the readout switch RSW turns on, and the readout transfer unit 33 turns to a state where a touch signal is detectable. That is, detection of the voltage Sig appearing in the signal line SGL afterward is executed. The read signal Read is also supplied to the transfer clock control circuit 37. In the transfer clock control circuit 37, as illustrated in FIG. 4, when the read signal Read turns to the "H" level, the switch SW5 turns on, and the switch SW6 turns off. Thereby, a change in the clock control permission signal clk_en as an input signal of the transfer clock control circuit 37 (a change from the logic "L" to the logic "H") is allowed to be captured.

In the sensor readout circuit 3, in response to the change in the voltage Sig of the signal line SGL (from the "H" level to the "L" level), an output of the comparator 331 changes from the "L" level to the "H" level, and an output of the D-type flip-flop 332 changes from the "H" level to the "L" level. In response to the change, the transistor switch CSW turns off from on, and the clock control permission signal clk_en changes from the "L" level to the "H" level. In the transfer clock control circuit 37, the clock control permission signal clk_en is captured, and the clock stop signal clk_end as an output signal of the transfer clock control circuit 37 changes from the "L" level to the "H" level (refer to FIG. 5(G)).

That is, even if only one of touch sensors TS in one horizontal line subjected the touch detection operation detects a touch, a corresponding transistor switch CSW turns on, and the clock control permission signal clk_en changes from the "L" level to the "H" level, and the clock stop signal clk_end also changes from the "L" level to the "H" level accordingly.

After that, at the timing T3, when the read signal Read changes to the "L" level, in the transfer clock control circuit 37, the switch SW5 turns off, and the switch SW6 turns on. Thereby, the transfer clock control circuit 37 suspends capturing the clock control permission signal clk_en, and keeps the clock stop signal clk_end as an output signal to the "H" level. A state where the clock stop signal elk_end is kept to the "H" level is maintained until the "H" level is supplied as a next precharge signal Pre and the clock stop signal clk_end is reset by the NOR circuit NOR1 (refer to FIG. 5(G)).

The timing generator 35 generates the transfer clock SCK only during a period where the clock stop signal clk_end is in the "H" level (refer to FIG. 5(H)) to supply the transfer clock SCK to the shift register of the operation section 31. That is, the timing generator 35 supplies the transfer clock SCK to the shift register only in the case where a touch is detected in one horizontal line subjected to the touch detection operation.

That is, when a touch is not made, as illustrated in the right-half part of FIG. 5, the voltage Sig of the signal line SGL remains at the recharge voltage PRE and does not change even after the precharge operation (refer to FIG. 5(D)). Therefore, the output of the D-type flip-flop 332 remains at the "H" level and does not change. Therefore, the transistor switch CSW remains off, and the clock control permission signal clk_en remains at the "L" level and does not change. As a result, the clock stop signal clk_end also remains at the "L" level and does not change (refer to FIG. 5(G)), and the transfer clock SCK is not generated (refer to FIG. 5(H)).

The shift register configured of a plurality of D-type flip-flops 332 of the operation section 31 performs parallel-to-serial conversion by supplying the transfer clock SCK to the shift register. That is, the shift register performs parallel-to-serial conversion on information of a touch detection result for one horizontal line only in the case where a touch is made, and outputs the information as the sensor output transfer signal Dout. The sensor output transfer signal Dout is transferred to outside through the output buffer circuit 36.

In addition, as described above, in this example, in the pixels PIX, one touch sensor TS is allocated to every two pixels PIX in the vertical direction in FIG. 1. Therefore, a period of outputting the sensor output transfer signal Dout (corresponding to a period where the transfer clock SCK is present in FIG. 5(H)) is 2H. That is, in the example, the transfer operation of the touch detection result to outside is performed for approximately a period of 1H to 2H (for one horizontal line period to two horizontal line periods) from the time of the touch operation.

As described above, in the display 1, a touch to one horizontal line is detected in a period from the timing T1 to the timing T3, and after that, the detection result is transferred to outside as serial data.

On the other hand, the display operation is performed from the timing T3 afterward. In the source driver 6, from the timing T3 afterward, the select signals SEL for colors RGB sequentially turn to an activation level ("H") (refer to FIG. 5(C)). Thereby, the writing switches WSW turn on sequentially, and the source driver 6 applies the pixel signal to the signal line SGL (refer to FIG. 5(D)), and the pixels PIX perform display in response to the pixel signal.

As described above, in the display 1, the sensor readout circuit 3 performs parallel-to-serial conversion on the touch detection result for one horizontal line and supplies the detection result to the IC 5 as serial data. Thereby, as illustrated in FIG. 1, a reduction in the number of lines between the sensor readout circuit and the IC 5 is allowed to cause a reduction in a wiring region, so the frame region of the display 1 is allowed to be reduced. In other words, downsizing of the display 1 is allowed.

Moreover, the display 1 constantly performs the touch detection operation from one horizontal line to another by sequential-scanning, and performs the parallel-to-serial conversion operation on the touch detection result for each horizontal line only in the case where it is determined that a touch is made. Thereby, the display 1 is allowed to achieve high response performance while reducing power consumption.

Comparative Example

Next, a display according to a comparative example with respect to the embodiment will be described below. The comparative example is a display 1x configured by using a sensor readout circuit without the transistor switch CSW. In addition, substantially like components are denoted by like numerals as of the display 1 according to the embodiment and will not be further described.

Figure 6:
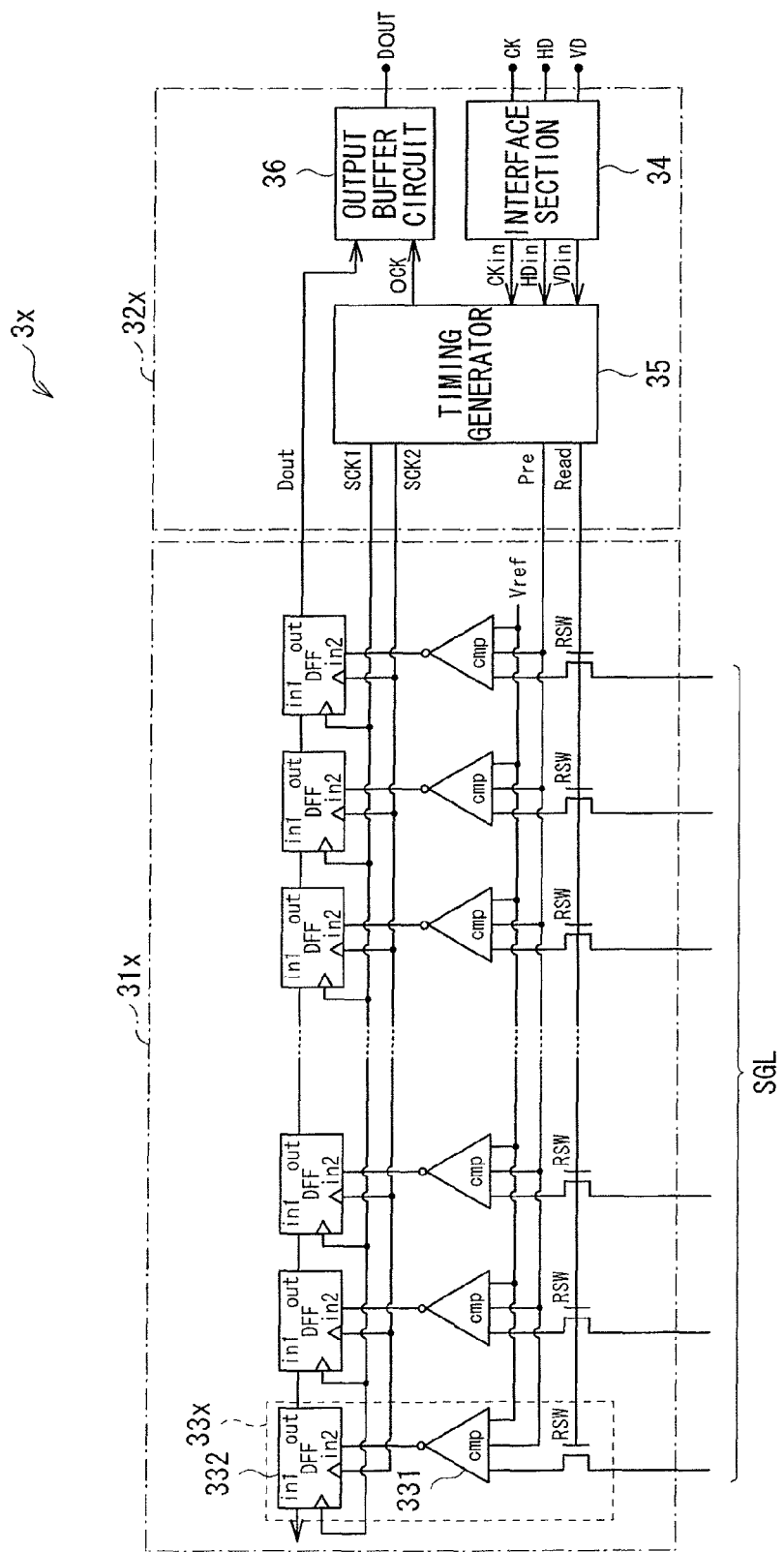
FIG. 6 is a block diagram illustrating a configuration example of a sensor readout circuit according to a comparative example.

FIG. 6 illustrates a circuit configuration example of a sensor readout circuit 3x according to the comparative example. The sensor readout circuit 3x includes an operation section 31x and a control IO section 32x.

The operation section 31x includes a plurality of readout transfer units 33x which are serially connected to one another. Each of the readout transfer units 33X according to the comparative example does not include the transistor switch CSW, compared to the readout transfer units 33 (refer to FIG. 2) according to the embodiment.

The control IO section 32x includes a timing generator 35x. Moreover, the control IO section 32x does not include the transfer clock control circuit 37 connected to the transistor switch CSW in the sensor readout circuit 3 (refer to FIG. 2) according to the embodiment. Accordingly, as will be described later, the timing generator 35x does not have a function of stopping the supply of the transfer clock SCK by external control.

Figure 7:
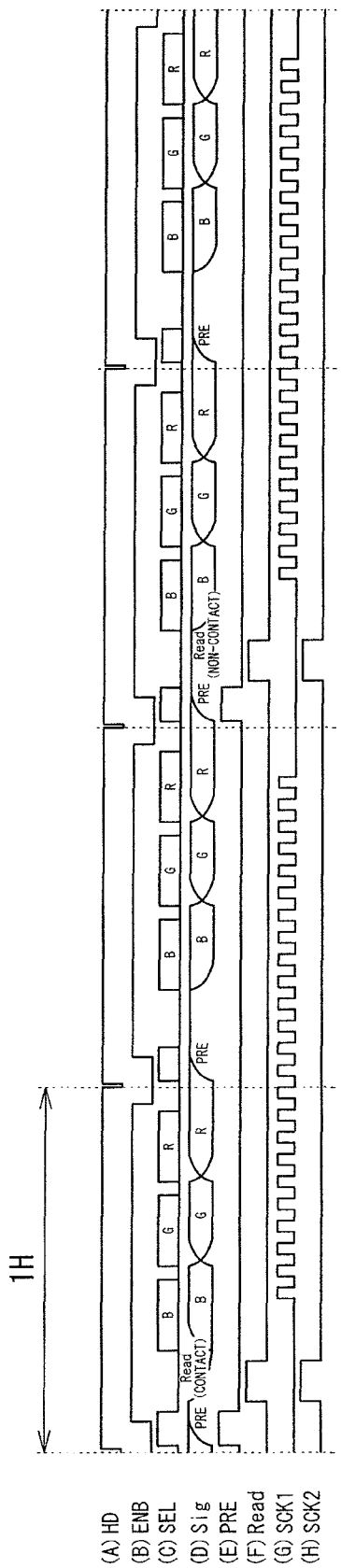
FIG. 7 is a timing waveform diagram illustrating an operation example of a display according to a comparative example.

FIG. 7 illustrates an example of a timing waveform diagram of the display 1x, and (A) indicates a waveform of the horizontal synchronization signal HD, (B) indicates a waveform of the writing enable pulse ENB, (C) indicates a waveform of the select signal SEL, (D) indicates a waveform of the voltage Sig of the signal line SGL, (E) indicates a waveform of the precharge signal Pre, (F) indicates a waveform of the read signal Read, (G) indicates a waveform of the transfer clock SCK1, and (H) indicates a waveform of the transfer clock SCK2. A left-half part of FIG. 7 indicates an operation in the case where a touch is made, and a right-half part of FIG. 7 indicates an operation in the case where the touch is not made.

As illustrated in FIG. 7, in the display 1x, the transfer clock SCK is generated by the timing generator 35x irrespective of whether or not a touch is made, and is supplied to the shift register. Therefore, in the display 1x, power consumption is increased.

Typically, while the display operation is constantly performed, the touch detection operation is not necessarily performed constantly. That is, typically, the frequency with which a user inputs information with use of the touch panel is considered extremely low. Therefore, as in the case of the comparative example, continuation of the touch detection operation by supplying the transfer clock SCK irrespective of whether or not a touch is made causes a large disadvantage specifically for a display of a mobile device in terms of power consumption.

On the other hand, in the display 1 according to the embodiment, the transfer clock SCK is supplied to the shift register only in the case where it is determined from the touch detection result for one horizontal line that a touch is made. That is, in the sensor readout circuit 3 of the embodiment, the shift register operates only when it is necessary to transfer the touch detection result to outside. Therefore, in the display 1, a reduction in power consumption is allowed. Moreover, the transfer operation is performed for approximately a period of 1H to 2H from the touch operation, so responsivity is good.

[Effects]

As described above, in the embodiment, the touch detection operation is constantly performed from one horizontal line to another by sequential-scanning, and only in the case where it is determined from the touch detection result for each horizontal line that a touch is made, the parallel-to-serial conversion operation is performed, and serial data is transferred to outside, so high response performance is achievable while reducing power consumption.

Moreover, in the embodiment, the sensor readout circuit transfers the touch detection result as serial data to the IC, so the frame region of the display is allowed to be reduced, thereby downsizing of the display is achievable.

Further, in the embodiment, the gate control line GCL and the signal line SGL are used in both of the display operation and the touch detection operation, so a reduction in lines in the display section 2 is allowed.

Modification Example 1-1

Next, a display according to a modification example of the embodiment will be described below. The comparative example is a display 1S configured by using a display section in which lines are not shared between in the display operation and in the touch detection operation. In addition, substantially like components are denoted by like numerals as of the display 1 according to the embodiment and will not be further described.

Figure 8:
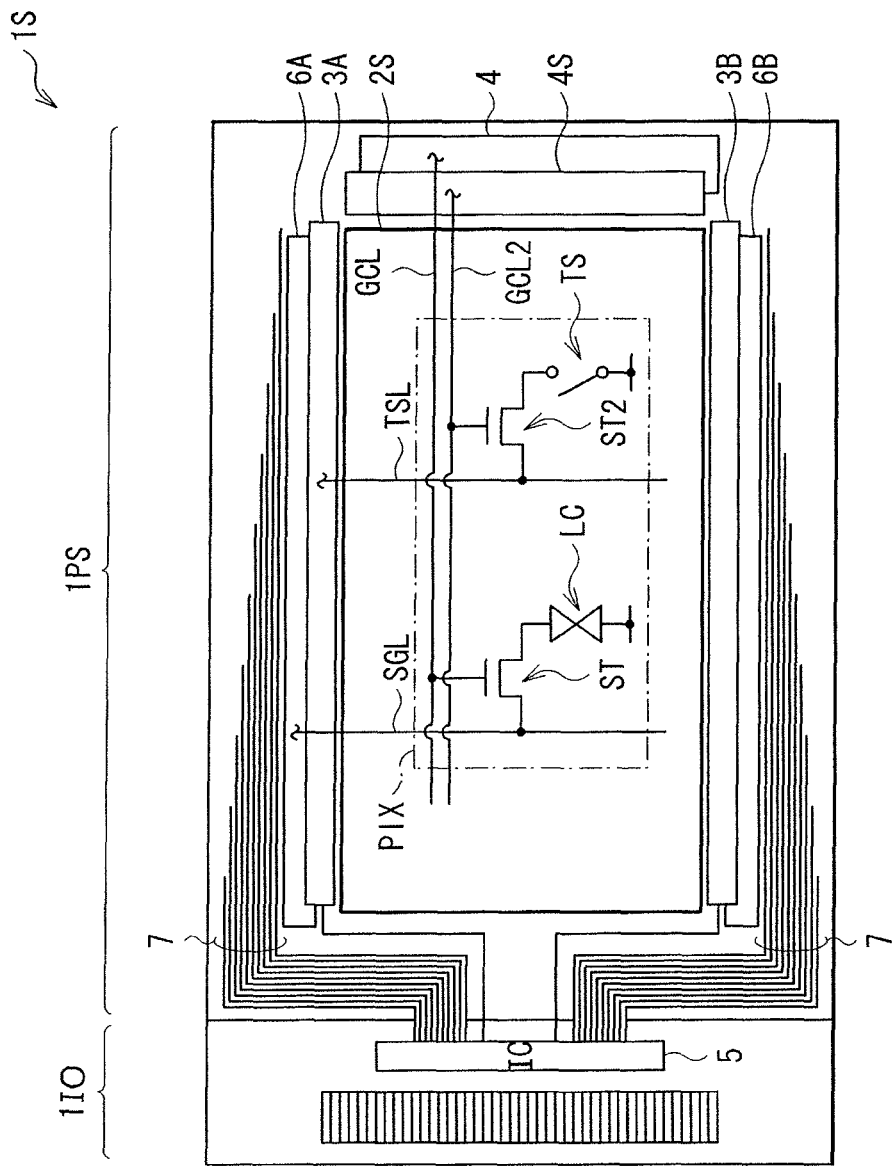
FIG. 8 is a schematic view illustrating a configuration example of a display according to a modification example.

FIG. 8 illustrates a configuration example of the display 1S according to the comparative example. The display 1S includes a display section 2S and a vertical drive circuit for sensor 4S.

The display section 2S includes a sensor line TSL, a gate control line for sensor GCL2 and a select transistor for sensor ST2. In the display section 2S, unlike the display section 2 (refer to FIG. 1), the touch sensor TS is configured separately from the liquid crystal element LC. In the select transistor for sensor ST2, one of a source and a drain is connected to the sensor line TSL, and the other is connected to the touch sensor TS. A gate of the select transistor for sensor ST2 is connected to the gate control line for sensor GCL2. The gate control line for sensor GCL2 is connected to the vertical drive circuit for sensor 4S, and the sensor line TSL is connected to the sensor readout circuit 3.

The vertical drive circuit for sensor 4S has a function of selecting a pixel PIX to be subjected to the touch detection operation. More specifically, the vertical drive circuit for sensor 4S applies a signal for selecting the touch sensor TS to the gate control line for sensor GCL2.

By this configuration, in the display operation, the signal line SGL and the gate control line GCL are used, and in the touch detection operation, the sensor line TSL and the gate control line for sensor GCL2 are used.

As in the case of the display 1 according to the above-described embodiment, the display 1S performs parallel-to-serial conversion operation only in the case where it is determined from a touch detection result for each horizontal line that a touch is made. Thereby, the display 1S is allowed to achieve high response performance while reducing power consumption.

Moreover, the display 1S is configured by separately including the touch sensor TS and the liquid crystal element LC, so the display operation and the touch detection operation are allowed to be performed independently, and a flexible touch detection operation is achievable.

2. SECOND EMBODIMENT

Next, a display according to a second embodiment of the invention will be described below. A display 1A according to the embodiment is applied to a display performing a line inversion drive, and is allowed to perform a touch detection operation even in the case where the precharge operation is performed in an AC-like manner in response to a common drive signal COM. In addition, substantially like components are denoted by like numerals as of the display 1 according to the above-described embodiment and will not be further described.

Configuration Example

Figure 9:
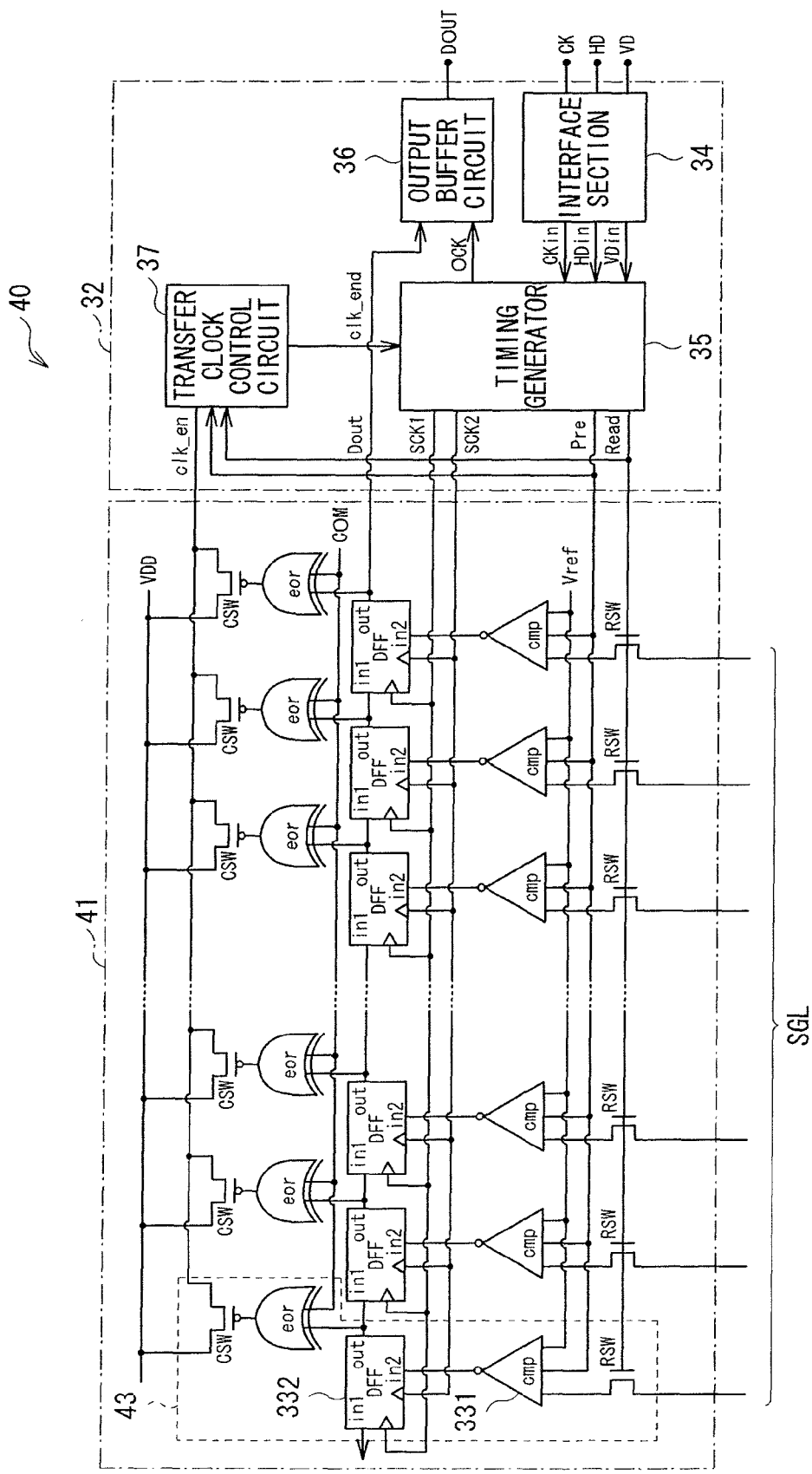
FIG. 9 is a block diagram illustrating a configuration example of a sensor readout circuit according to a second embodiment of the invention.

FIG. 9 illustrates a circuit configuration example of a sensor readout circuit 40 in the display according to the embodiment. The sensor readout circuit 40 includes an operation section 41.

The operation section 41 includes a plurality of readout transfer units 43 which are serially connected to one another. Each of the readout transfer units 43 includes an exclusive OR circuit (eor) XOR. A first input terminal of the exclusive OR circuit XOR is connected to an output terminal of the D-type flip-flop 332, and the common drive signal COM is supplied to a second input terminal of the exclusive OR circuit XOR, and an output terminal of the exclusive OR circuit XOR is connected to a gate terminal of the transistor switch CSW, and the exclusive OR circuit XOR generates and outputs an exclusive OR of signals supplied to the first input terminal and the second input terminal. Thereby, as will be described later, the display 1A is allowed to perform the touch detection operation even in the case where the precharge operation is performed in an AC-like manner in the line inversion drive in which a pixel signal and the common drive signal COM are inverted at every horizontal line (1H). Other configurations are the same as those in FIG. 1.

Herein, the exclusive OR circuit corresponds to a specific example of "logic gate circuit" in the invention.

[Operations and Functions]

Figure 10:
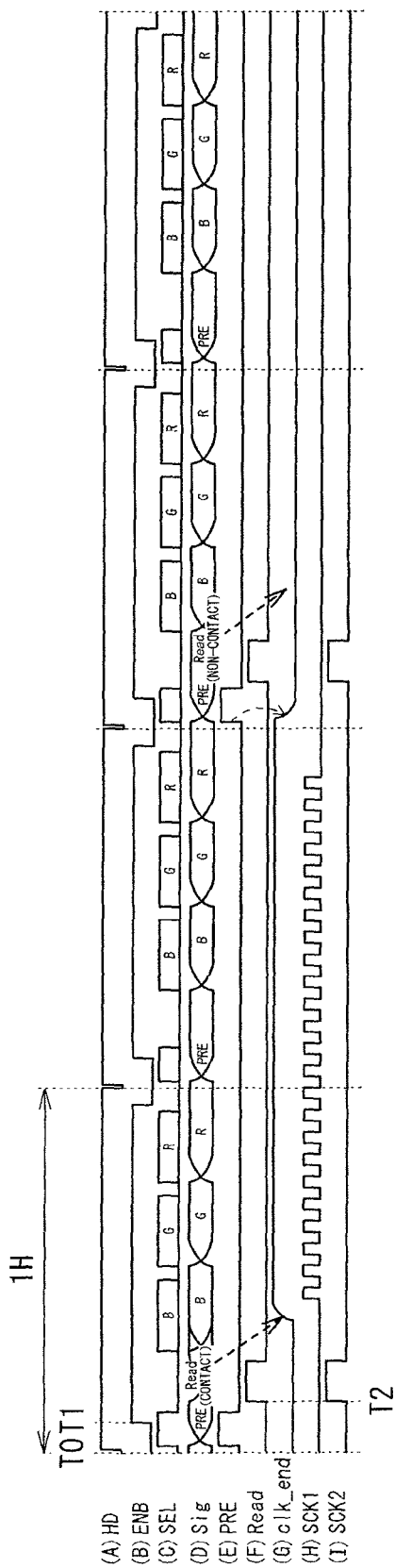
FIG. 10 is a timing waveform diagram illustrating an operation example of a display illustrated in FIG. 9.

FIG. 10 illustrates an example of a timing waveform diagram of the display 1A, and (A) indicates a waveform of the horizontal synchronization signal HD, (B) indicates a waveform of the writing enable pulse ENB, (C) indicates a waveform of the select signal SEL, (D) indicates a waveform of the voltage Sig of the signal line SGL, (E) indicates a waveform of the precharge signal Pre, (F) indicates a waveform of the read signal Read, (G) indicates a waveform the clock stop signal clk_end, (H) indicates a waveform of the transfer clock SCK1, and (I) indicates a waveform of the transfer clock SCK2. A left-half part of FIG. 10 indicates an operation in the case where a touch is made, and a right-half part of FIG. 10 indicates an operation in the case where the touch is not made.

Hereinafter, the left-half part of FIG. 10, that is, the operation in the case where the touch is made will be described in detail referring to, as necessary, the right-half part (the operation in the case where the touch is not made) of FIG. 10 for comparison.

First, at the timing T0, the timing generator 35 generates the precharge signal Pre as a positive pulse having a predetermined duration in synchronization with the horizontal synchronization signal HD (refer to FIG. 10(E)). The source driver 6 performs the precharge operation on the signal line SGL in response to the precharge signal Pre, and the comparator 331 is allowed to perform a touch signal detection operation.

The source driver 6 sets the polarity of the voltage Sig of the signal line SGL to be inverted at every horizontal line in the precharge operation (refer to FIG. 10(D)). It is because of the following reason. That is, in the line inversion drive, the common drive signal COM of which the polarity is inverted at every horizontal line is supplied to the common electrode for the pixels PIX. Moreover, a pixel signal of which the polarity is inverted at every horizontal line is supplied from the source driver 6 to the pixel electrode of the pixel PIX. Thereby, the liquid crystal element LC performs display based on a potential difference between the voltage of the pixel electrode and the voltage of the common electrode. At this time, it is also necessary to set the precharge voltage PRE to be synchronized with the common drive signal COM. More specifically, the source driver 6 operates so that in the precharge operation, the voltage Sig of the signal line SGL is set to a voltage level of "xCOM" which is an inverted voltage level of the common drive signal COM. That is, in the case where the common drive signal COM is in the "H" level, the precharge voltage PRE turns to the "L" level, and in the case where the common drive signal COM is in the "L" level, the precharge voltage PRE turns to the "H" level. Then, as in the case of the common drive signal COM, the precharge voltage PRE is inverted at every horizontal line. The display 1 is allowed to perform a desired display operation by the precharge operation in an AC-like manner.

After the precharge operation is completed at the timing T1, at the timing T2, the timing generator 35 generates a pulse of the read signal Read (refer to FIG. 10(F)). Thereby, as in the case of the first embodiment, the comparator 331 reads out the voltage Sig of the signal line SGL to determine whether or not a touch is made. In the case where the touch sensor TS is in an on state, the voltage Sig of the signal line SGL changes to be inverted from an "xCOM" level set by the precharge operation to a "COM" level (refer to FIG. 10(D)). It is because when the touch sensor TS turns on, the pixel electrode set to the "xCOM" level by the precharge operation comes in contact with the common electrode, and the "COM" level applied to the common electrode is supplied to the pixel electrode. The comparator 31 detects a change in the voltage Sig of the signal line SGL, and changes its output voltage from the "COM" level to the "xCOM" level. Then, the D-type flip-flop 332 changes its output voltage from the "xCOM" level to the "COM" level based on a change in the output voltage of the comparator 31. That is, when a touch is detected, in the case where the common drive. signal COM is in the "H" level, the output voltage of the D-type flip-flop 332 changes from the "L" level to the "H" level, and in the case where the common drive signal COM is in the "L" level, the output voltage of the comparator 31 changes from the "H" level to the "L" level. Thus, in the case where the line inversion drive is performed, the behavior of an output signal of the D-type flip-flop 332 is different between in the "H" level and in the "L" level.

The exclusive OR circuit XOR is used for converting a logic when the transistor switch CSW is controlled based on the output signal of the D-type flip-flop 332 so as not to become dependent on the common drive signal COM. More specifically, the exclusive OR circuit XOR determines an exclusive OR of the output of the D-type flip-flop 332 and the common drive signal COM to supply a result of the exclusive OR to the gate of the transistor switch CSW. That is, when a touch is detected, irrespective of whether the common drive signal COM is in the "H" level or the "L" level, the output of the exclusive OR circuit XOR changes from the "H" level to the "L" level. In response to the change, the transistor switch CSW turns on from off, and the clock control permission signal clk_en changes from the "L" level to the "H" level. Subsequent operations are the same as those in the first embodiment. That is, the transfer clock control circuit 37 changes the clock stop signal clk_end as an output signal from the "L" level to the "H" level in response to the clock control permission signal clk_en (refer to FIG. 10(G)). The timing generator 35 supplies to the transfer clock SCK to the operation section 41 while the clock stop signal clk_end is in the "H" level (refer to FIG. 10(H)). The shift register performs the parallel-to-serial conversion operation in response to the transfer clock SCK, and information of touch detection in one horizontal line is outputted as the sensor output transfer signal Dout. The serial data is transferred to outside through the output buffer circuit 36.

On the other hand, in the case where the touch is not made, as illustrated in the right-half part of FIG. 10, the voltage Sig of the signal line SGL remains in the "xCOM" level set by the precharge operation and does not change even after the precharge operation (refer to FIG. 10(D)). Therefore, the output of the D-type flip-flop 332 remains in the "xCOM" level and does not change. Therefore, the transistor switch CSW remains off, and the clock control permission signal clk_en remains in the "L" level and does not change. As a result, the clock stop signal clk_end also remains in the "L" level and does not change (refer to FIG. 10(G)), and the transfer clock SCK is not generated (refer to FIG. 10(H)). That is, in the case where the touch is not made, the shift register does not perform the parallel-to-serial conversion operation, and does not perform transfer of serial data to outside.

[Effects]

As described above, in the embodiment, the exclusive OR circuit XOR is arranged between the output of the D-type flip-flop 332 and the transistor switch CSW, so the display performing the line inversion drive is also allowed to perform touch detection. Other effects are the same as those in the first embodiment.

3. THIRD EMBODIMENT

Next, a display according to a third embodiment of the invention will be described below. A display 1B according to the embodiment is applied to a display performing a line inversion drive, and is allowed to dynamically change the frequency of detection operation by a sensor readout circuit or the like depending on whether or not a touch is made. In addition, substantially like components are denoted by like numerals as of the displays according to the above-described first and second embodiments and will not be further described.

Configuration Example

Figure 11:
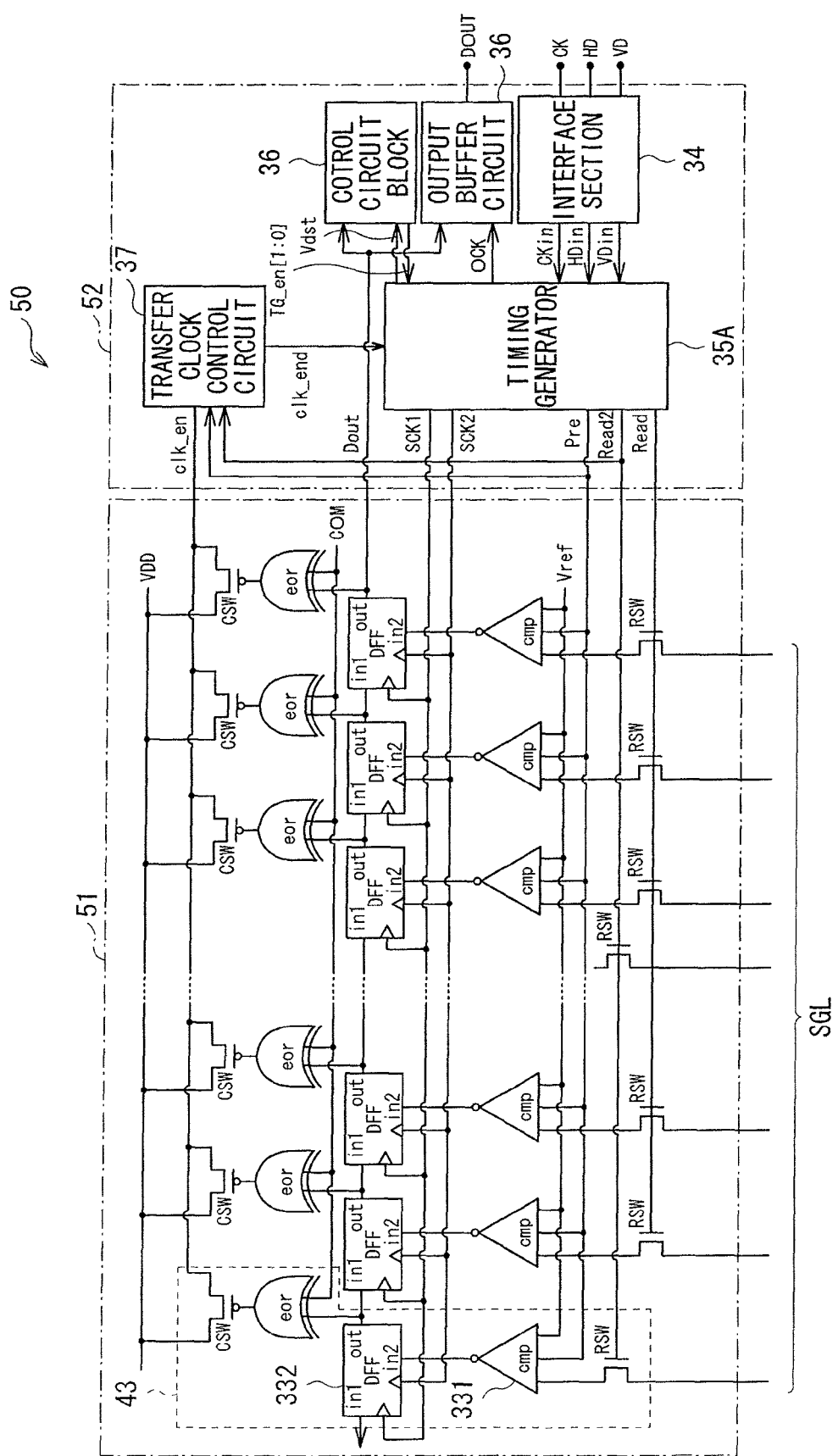
FIG. 11 is a block diagram illustrating a configuration example of a sensor readout circuit according to a third embodiment of the invention.

FIG. 11 illustrates a circuit configuration example of a sensor readout circuit 50 in the display according to the embodiment. The sensor readout circuit 50 includes an operation section 51 and a control IO section 52.

In the operation section 51, compared to the operation section 41 according to the second embodiment (refer to FIG. 9), connections of gate terminals of some readout switches RSW are changed. That is, in the example, a second read signal Read2 instead of the read signal Read is supplied to a gate of one readout switch RSW in every four readout switches RSW. The second read signal Read2 is generated by a timing generator 35A (which will be described later).

The control IO section 52 includes a control circuit block 38 and the timing generator 35A.

The control circuit block 38 is a circuit setting an operation mode for limiting an operation of a touch panel so as to reduce power consumption in the case where a touch is not detected in a predetermined number of frames. More specifically, the control circuit block 38 generates an operation mode signal TG_en[1:0] based on serial data supplied from the shift register of the operation section 51 and a signal Vdst outputted from the timing generator 35A, and supplies the operation mode signal TG_en[1:0] to the timing generator 35A. The signal Vdst is a signal generated from the vertical synchronization signal VD, and is generated in synchronization with the vertical synchronization signal VD. That is, the control circuit block 38 determines a duration where a touch is not made in frame as a unit by counting the signal Vdst over a duration where data is not transferred from the shift register of the operation section 51. Then, the control circuit block 38 has a function of recognizing a reduction in use frequency as a touch panel when a touch is not made for a predetermined period (for example, for a few frame periods) and setting the operation mode so as to reduce power consumption.

In this example, the display 1B has three modes (a normal mode, a non-contact mode A and a non-contact mode B) as the operation modes of the touch panel. The normal mode is an operation mode when a touch is detected in the touch panel, and, for example, as described in the above-described first embodiment, touch detection is performed at every period of 2H (every two horizontal line periods). The non-contact mode A is an example of a mode for reducing power consumption, and in the non-contact mode A, only the readout transfer unit 43 controlled by the second read signal Read2 is allowed to operate, and touch detection is performed at every period of 8H (every 8 horizontal line periods). That is, in the non-contact mode A, the position accuracy and operation frequency of touch detection are ⅓ of those in the normal mode. The non-contact mode B is an example of a mode for further reducing power consumption, and in the non-contact mode B, only the readout transfer unit 43 controlled by the second read signal Read2 is allowed to operate, and touch detection at every period of 8H is performed at every period of 3F (every 3 frame periods). That is, in the non-contact mode B, the operation frequency of touch detection is ⅓ of that in the non-contact mode A. The control circuit block 38 generates the operation mode signal TG_en[1:0] corresponding to one of these operation modes according to a touch state in the touch panel, and instructs the operation mode to the timing generator 35A. More specifically, the control circuit block 38 outputs, as the operation mode signal TG_en[1:0], "00b" in the case where the operation mode of the touch panel is set to the normal mode, "01b" in the case where the operation mode of the touch panel is set to the non-contact mode A, and "11b" in the case where the operation mode of the touch panel is set to the non-contact mode A.

The timing generator 35A controls the operation section 51 in response to the operation mode signal TG_en[1:0] supplied from the control circuit block 38. Other functions of the timing generator 35A are the same as those in the timing generator 35 of the first and second embodiments. In the first and second embodiments, as illustrated in FIGS. 2 and 9, the read signal is supplied to the transfer clock control circuit 37, but in the embodiment, instead of the read signal, the second read signal Read2 is supplied to the transfer clock control circuit 37. Thereby, as will be described later, the timing generator 35A is allowed to control the transfer clock control circuit 37 in the same manner as the first and second embodiment even in the non-contact modes A and B where all of the readout transfer units 43 of the operation section 51 are not allowed to operate.

Herein, the transistor switch CSW, the transfer clock control circuit 37, the timing generator 35A and the control circuit block 38 correspond to specific examples of "control section" in the invention.

[Operations and Functions]

Next, referring to FIGS. 12 and 13, operations and functions of the display 1B will be described below.

Figure 12:
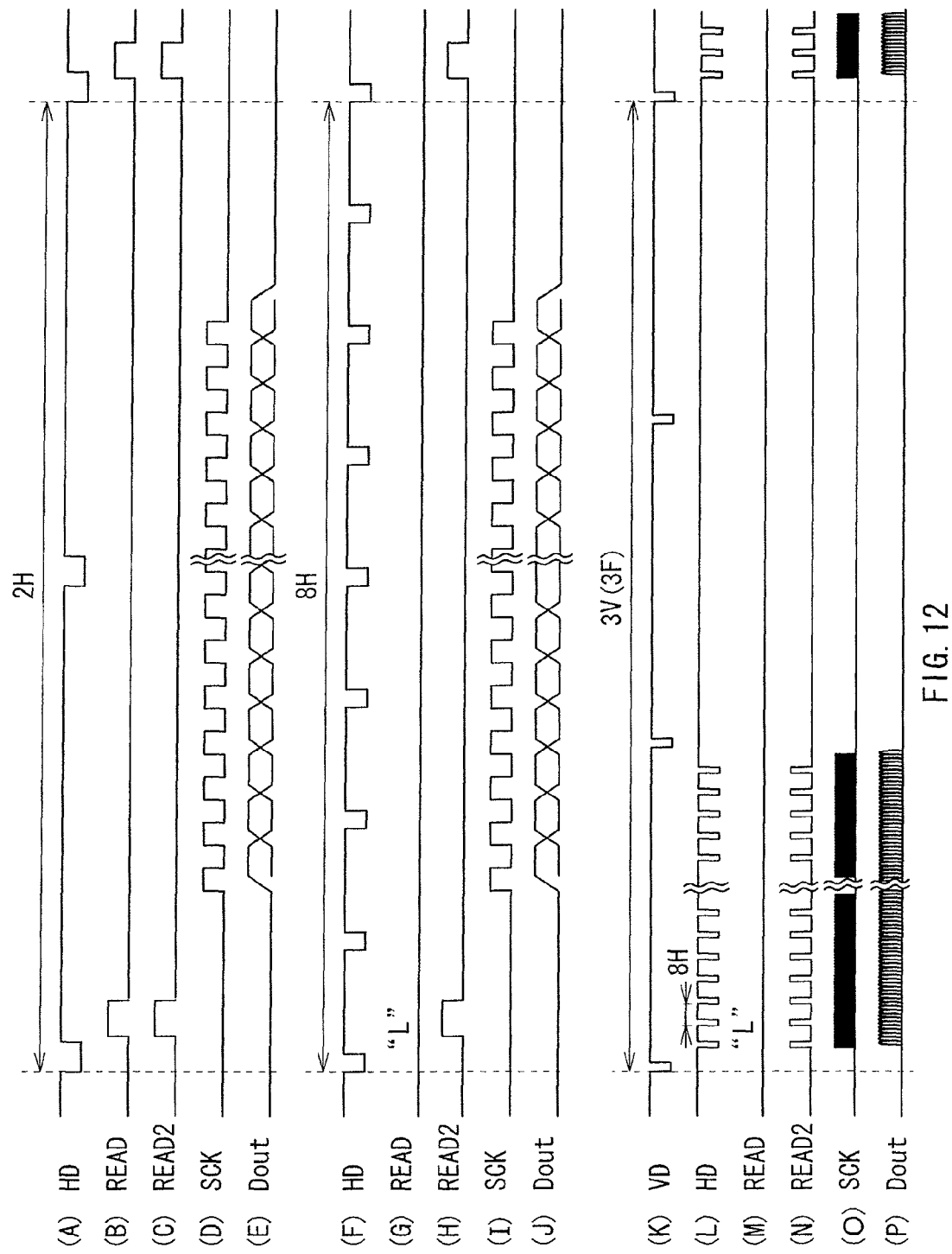
FIG. 12 is a timing waveform diagram illustrating an operation example of a sensor readout circuit illustrated in FIG. 11.

FIG. 12 illustrates an example of a timing waveform diagram of the display 1B.

In FIG. 12, (A) to (E) illustrate timing waveform diagrams when a touch is made in the normal mode, and (A) indicates a waveform of the horizontal synchronization signal HD, (B) indicates a waveform of the read signal Read, (C) indicates a waveform of the second read signal Read2, (D) indicates a waveform of the transfer clock SCK, and (E) indicates a waveform of the sensor output transfer signal Dout.

In FIG. 12, (F) to (J) illustrate timing waveform diagrams when a touch is made in the non-contact mode A, and (F) indicates a waveform of the horizontal synchronization signal HD, (G) indicates a waveform of the read signal Read, (H) indicates a waveform of the second read signal Read2, (I) indicates a waveform of the transfer clock SCK, and (J) indicates a waveform of the sensor output transfer signal Dout.

In FIG. 12, (K) to (P) illustrate timing waveform diagrams in the non-contact mode B, and (K) indicates a waveform of the vertical synchronization signal VD, (L) indicates a waveform of the horizontal synchronization signal HD, (M) indicates a waveform of the read signal Read, (N) indicates a waveform of the second read signal Read2, (O) indicates a waveform of the transfer clock SCK, and (P) indicates a waveform of the sensor output transfer signal Dout.

Figure 13:
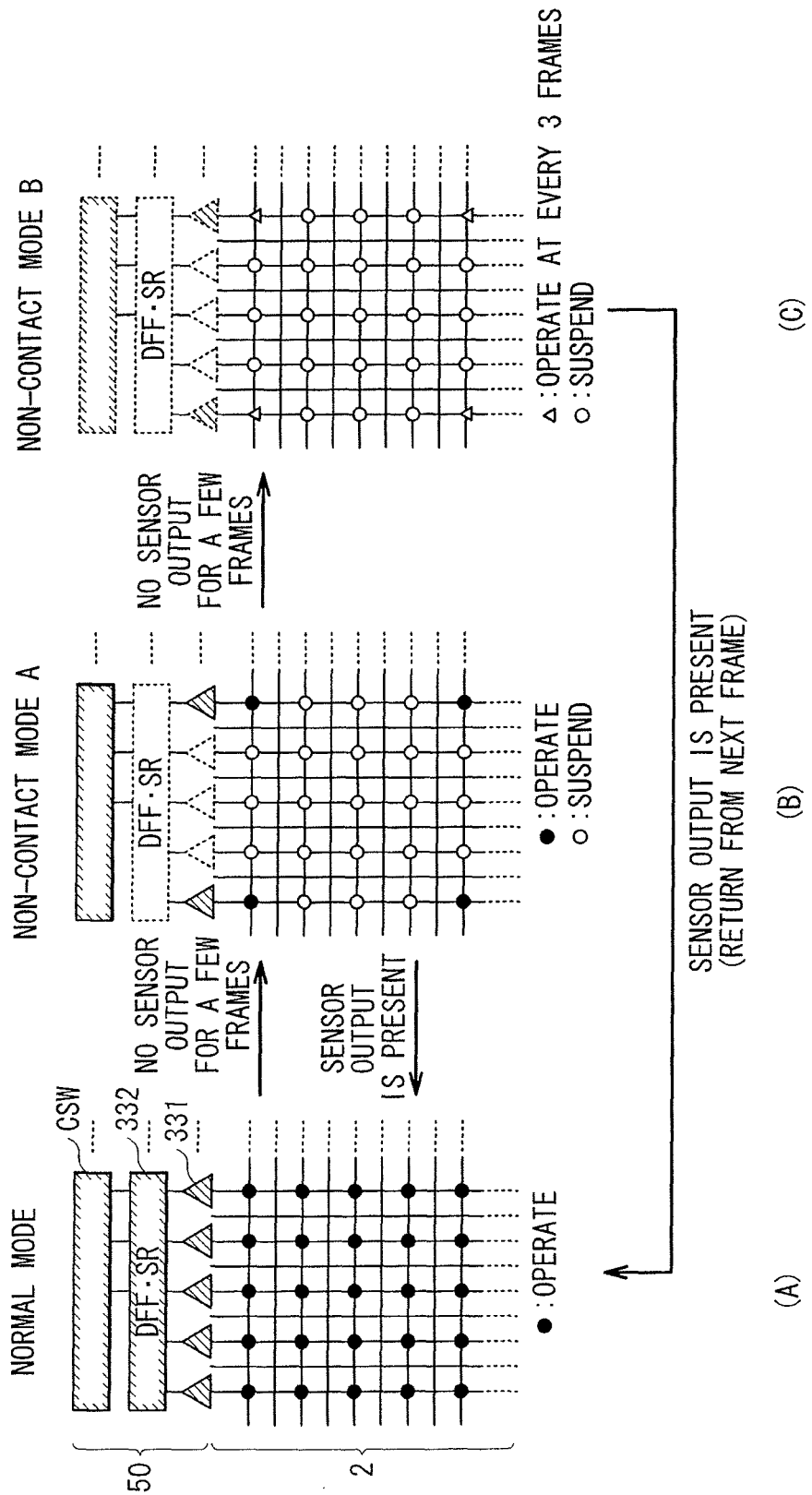
FIG. 13 is a schematic view illustrating an operation example of a display using the sensor readout circuit illustrated in FIG. 11.

FIG. 13 illustrates a conceptual diagram of each operation mode of the touch panel in the display 1B, and (A) indicates an operation in the normal mode, (B) indicates an operation in the non-contact mode A, and (C) indicates an operation in the non-contact mode B. FIG. 13 schematically illustrates operation states of the sensor readout circuit 50 and a matrix arrangement of the pixels PIX of the display section 2. The transistor switch CSW in FIG. 13 indicates a block of a plurality of transistor switches CSW illustrated in FIG. 11. A D-type flip-flop-shift register (DFF·SR) 332 indicates a block of a plurality of D-type flip-flop 332 illustrated in FIG. 11. In the sensor readout circuit 50, a part enclosed by a heavy line indicates a block operating (or operable) in response to the supply of a clock or an operation enable signal, and a part not enclosed by a heavy line indicates a block under suspension as the supply of a clock is suspended or the operation enable signal is not inputted. In the display section 2, a black circle indicates a pixel PIX subjected to the touch detection operation, and a white circle indicates a pixel PIX not subjected to the touch detection operation as the touch detection circuit is not activated. In FIG. 13, a black circle indicates "operate" and a white circle indicates "suspend". Moreover, a triangle mark indicates a pixel PIX subjected to the touch detection operation at every period of 3F (every 3 frame periods). In addition, an intersection point not indicated by the black circle, the white circle and the triangle mark indicates a display-only pixel PIX where the touch sensor TS is not arranged.

In the normal mode, as illustrated in FIGS. 12(A) to (E), the timing generator 35A generates pulses as the read signal Read and the second read signal Read2 (refer to FIGS. 12(B) and (C)) to supply the pulses to the operation section 51. Thereby, the touch detection operation is performed in all of a plurality of readout transfer units 43 of the operation section 51. As a result, in the operation section 51, as in the case of the above-described second embodiment, the touch detection operation is performed at every period of 2H (every 2 horizontal line periods), and when it is determined that a touch is made, parallel-to-serial conversion is performed on the detection result, and the detection result is transferred to the output buffer circuit 36 as the sensor output transfer signal Dout (refer to FIG. 12(E)).

In the normal mode, as illustrated in FIG. 13(A), all touch sensors TS of the display section 2 and all comparators 331 of the sensor readout circuit 50 operate. That is, in the display 1B, all touch sensors TS are in a state where a touch is detectable.

The control circuit block 38 recognizes a reduction in use frequency as the touch panel in the case where the sensor output transfer signal Dout is not present over a predetermined period (for example, one frame period), and outputs "01b" as the operation mode signal TG_en[1:0]. Thereby, the timing generator 35A controls the operation section 51 so that the touch panel of the display 1B operates in the non-contact mode A.

In the non-contact mode A, as illustrated in FIGS. 12(F) to (J), the timing generator 35A fixes the read signal Read to the "L" level (refer to FIG. 12(G)). Then, the timing generator 35A generates a pulse as the second read signal Read2 at every period of 8H (every 8 horizontal line periods) (refer to FIG. 12(H)) to supply the pulse to the operation section 51. Thereby, the touch detection operation is performed only in the readout transfer units 43 to which the second read signal Read2 is connected in a plurality of readout transfer units 43 of the operation section 51. As a result, in the operation section 51, the touch detection operation is performed on one in every four touch sensors TS arranged in the horizontal direction of the display section 2, and when it is determined that a touch is made, parallel-to-serial conversion is performed on the detection result, and the detection result is outputted as the sensor output transfer signal Dout (refer to FIG. 12(J)) to be transferred to outside through the output buffer circuit 36. Then, the operation is performed at every period of 8H (every 8 horizontal line periods).

In the non-contact mode A, as illustrated in FIG. 13(B), one in every four touch sensor TS arranged in the horizontal direction of the display section 2 and one in every four touch sensors TS arranged in the vertical direction of the display section 2 operate. Moreover, only comparators 331 corresponding to the operating touch sensors TS in the sensor readout circuit 50 operate. That is, in the display 1B, one in every 16 touch sensors TS in all touch sensors TS is in a state where a touch is detectable.

In the case where the sensor output transfer signal Dout is not present over another certain period (for example, 3 frame periods), the control circuit block 38 recognizes that the touch panel is not used, and outputs "11b" as the operation mode signal TG_en[1:0]. Thereby, the timing generator 35A controls the operation section 51 so that the touch panel of the display 1B operates in the non-contact mode B. The above-described "certain period" as a criterion for judgment of a shift to the non-contact mode B is set to be longer than the "certain period" as a criterion for judgment of a shift from the normal mode to the non-contact mode A.

In the non-contact mode B, as illustrated in FIGS. 12(K) to (P) and FIG. 13(C), the display 1B performs the same operation as that in the non-contact mode A at every period of 3F (every 3 frame periods).

In the non-contact modes A and B, according to the operation state of the touch panel by a user, the touch panel is set to have a pseudo-optimum touch sensor density, and the operation frequency of the comparator 331 or frequency with which the touch detection result is transferred to outside is allowed to be reduced. Thereby, a reduction in current consumption is allowed. Moreover, the operation frequency of the shift register configured of the D-type flip-flops 332 declines, so power consumption is allowed to be reduced. Further, in the timing generator 35A, the transfer clock control circuit 37, the control circuit block 38 and the like illustrated in FIG. 11, power consumption is allowed to be reduced.

In the non-contact modes A and B, in the case where the sensor output transfer signal Dout is supplied to the control circuit block 38, the control circuit block 38 recognizes that a touch operation on the touch panel is performed, and a counter based on the signal Vdst is reset, and "00b" is outputted as the operation mode signal TG_en[1:0]. Thereby, the timing generator 35A controls the operation section 51 so that the touch panel of the display 1B operates in the normal mode.

In addition, a period as a criterion for judgment of mode transfer is arbitrarily set. Moreover, as the operation mode achieving low power consumption, both of the non-contact mode A and the non-contact mode B are not necessarily included. For example, only two operation modes, that is, the normal mode and the non-contact mode B may be included. More specifically, for example, in the case where the sensor output transfer signal Dout is not present over a period of 3F (3 frame periods), the operation of the touch panel may be directly shifted from the normal mode to the non-contact mode B.

In the embodiment, the following advantages are obtained. First, a means for constantly detecting whether even one of the touch sensors TS is in a touch state or all touch sensors TS is in non-touch state is arranged in addition to, for example, a configuration in related art described PTLs 1 and 2. Therefore, the display is allowed to respond to a touch immediately, and power consumption is allowed to be remarkably reduced by performing a transfer operation only in the case where a touch is made. Second, a means for detecting that a sensor output is not present for a predetermined period is arranged, so when the sensor output is not present for a predetermined period, the number of operations of the comparator or operation frequency is reduced. Thereby, the number of apparent operating sensors is reduced to allow a reduction in power consumption when no contact is made. Third, the number of additional circuits for achieving a desired operation is small. Therefore, a display including a touch panel with high-speed response, low power consumption and a narrow frame is achievable.

[Effects]

As described above, in the embodiment, the control circuit block 38 is arranged, so the operation mode of the touch panel is changed depending on the use state of the touch panel, thereby while convenience when using the touch panel is maintained, a reduction in power consumption is efficiently achievable. Other effects are the same as those in the above-described first and second embodiments.

4. FOURTH EMBODIMENT

Next, a display according to a fourth embodiment of the invention will be described below. A display 1C according to the embodiment is a display configured by using a sensor readout circuit not having a parallel-to-serial conversion function. In addition, substantially like components are denoted by like numerals as of the display according to the above-described first and second embodiment and will not be further described.

Figure 14:
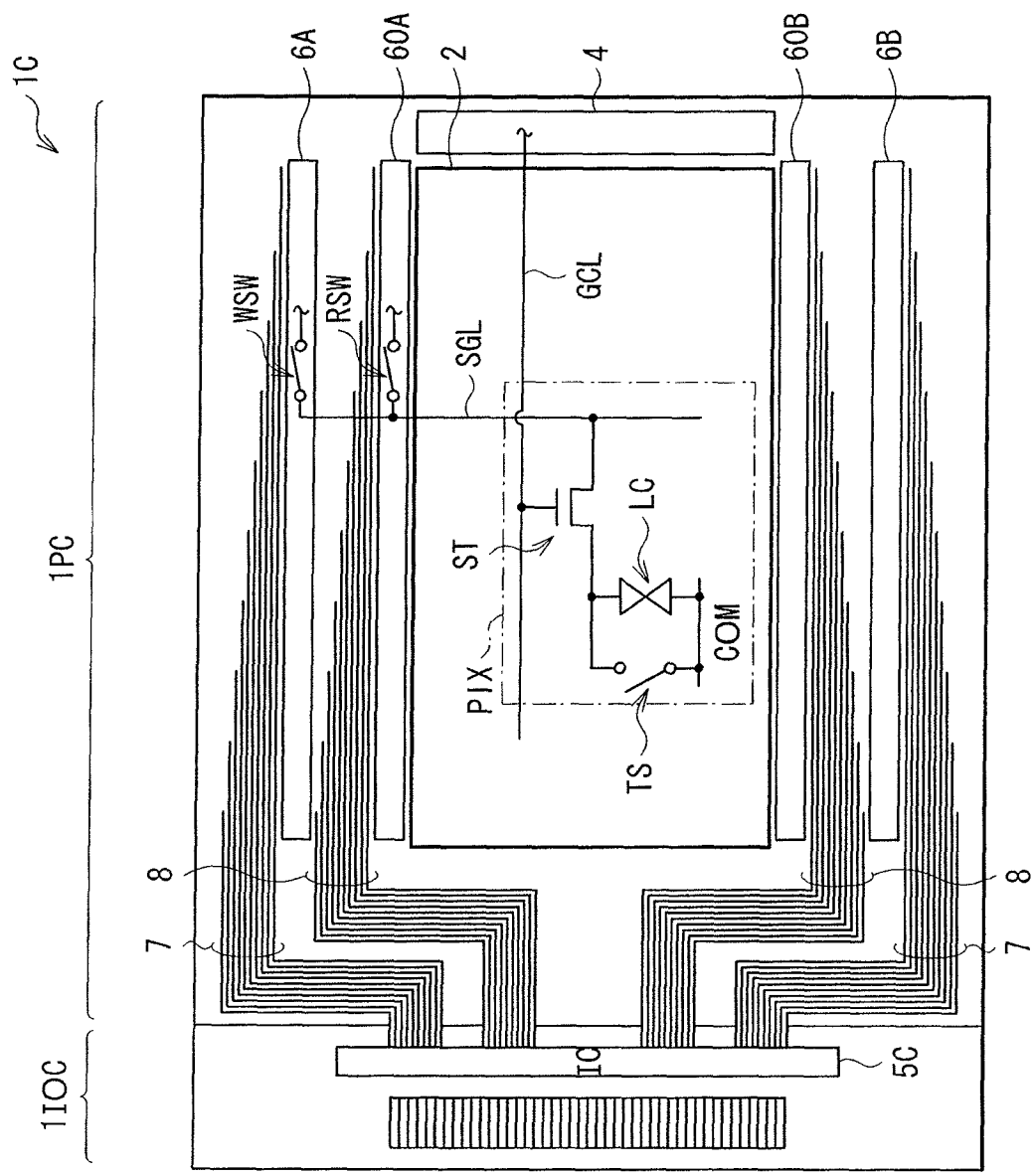
FIG. 14 is a schematic view illustrating a configuration example of a display according to a fourth embodiment of the invention.
Figure 15:
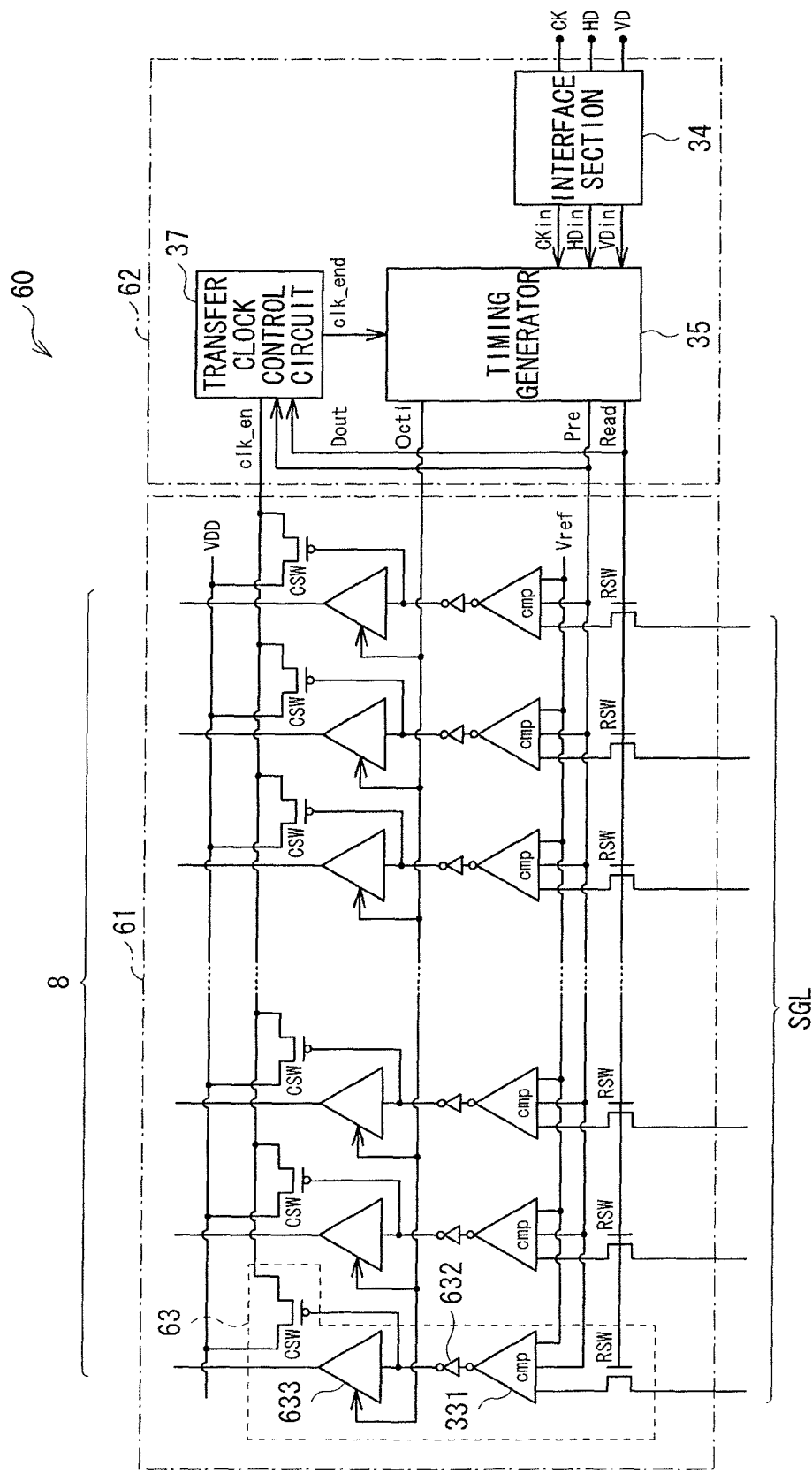
FIG. 15 is a block diagram illustrating a configuration example of a sensor readout circuit illustrated in FIG. 14.

FIG. 14 illustrates a configuration example of the display 1C, and FIG. 15 illustrates a circuit configuration example of a sensor readout circuit 60 in the display 1C. As illustrated in FIG. 14, the display 1C includes sensor readout circuits 60A and 60B and an IC 5C. As will be described later, the sensor readout circuits 60A and 60B do not perform parallel-to-serial conversion on a touch detection result and supply the touch detection result to the IC 5C through touch signal output lines 8. In addition, hereinafter, the sensor readout circuits 60A and 60B are collectively called sensor readout circuit 60 as necessary.

The sensor readout circuit 60 includes an operation section 61 and a control IO section 62. The operation section 61 includes a plurality of readout units 63. The readout units 63 each include an inverter 632 and an output buffer 633. The inverter 632 is a circuit inverting an output signal of the comparator 331. The output buffer 633 is a circuit driving the touch signal output lines 8 in response to an output signal of the inverter 632 when the circuit is activated by being subjected to activation control by an output control signal Oct1 supplied from a timing generator 64 (which will be described later) of the control IO section 62. More specifically, for example, the output buffer 633 is activated when the output control signal Oct1 is in the "H" level, and the output signal of the inverter 632 is latched, and the touch signal output lines 8 are driven in response to the signal, and when the output control signal Oct1 is in the "L" level, the output buffer 633 is in a power down state. The control IO section 62 includes the timing generator 64. The timing generator 64 generates the output control signal Oct1 in response to the clock stop signal clk_end supplied from the transfer clock control circuit 37 to supply the output control signal Oct1 to the output buffer 633 of the operation section 61.

Herein, the output buffer 633 corresponds to a specific example of "transfer output section" in the invention. The transistor switch CSW, the transfer clock control circuit 37 and the timing generator 64 correspond to specific examples of "control section" in the invention.

By this configuration, the sensor readout circuit 60 operates in the following manner. That is, when a touch is detected in the touch detection operation on one horizontal line, the transfer clock control circuit 37 generates the clock stop signal clk_end to supply the clock stop signal clk_end to the timing generator 35. The timing generator 64 controls the output control signal Oct1 in response to the clock stop signal clk_end supplied from the transfer clock control circuit 37, and controls the operation of the output buffer 633 of the operation section 31. That is, the output buffer 633 drives the touch signal output lines 8 only in the case where a touch is detected even at one point in the touch detection operation on one horizontal line, and when the touch is not detected, the output buffer 633 turns to a power down state.

As described above, in the embodiment, the touch detection operation on each horizontal line is constantly performed by sequential-scanning, and in the touch detection result for each horizontal line, the detection result is outputted only in the case where it is determined that a touch is made, and the power of the output buffer is down in the case where the touch is not made, so high response performance is achievable while reducing power consumption.

Moreover, in the embodiment, in both of the display operation and the touch detection operation, the gate control line GCL and the signal line SGL are used, so lines in the display section 2 is allowed to be reduced.

5. APPLICATION EXAMPLES

Next, referring to FIGS. 16 to 20, application examples of the display described in the above-described embodiments will be described below. The displays according to the above-described embodiments are applicable to electronic devices in any fields, such as televisions, digital cameras, notebook personal computers, portable terminal devices such as cellular phones, and video cameras. In other words, the displays according to the above-described embodiments are applicable to electronic devices displaying a picture signal inputted from outside or a picture signal produced inside as an image or a picture in any fields.

Application Example 1

Figure 16:
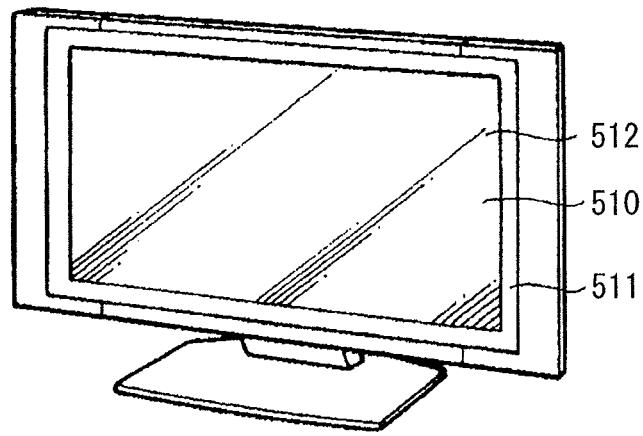
FIG. 16 is a perspective view illustrating an external configuration of Application Example 1 of a display with a touch sensor according to respective embodiments.

FIG. 16 illustrates an appearance of a television to which the display according to the above-described respective embodiments is applied. The television has, for example, a picture display screen section 510 including a front panel 511 and a filter glass 512, and the picture display screen section 510 is configured of the display according to the above-described respective embodiments.

Application Example 2

Figure 17:
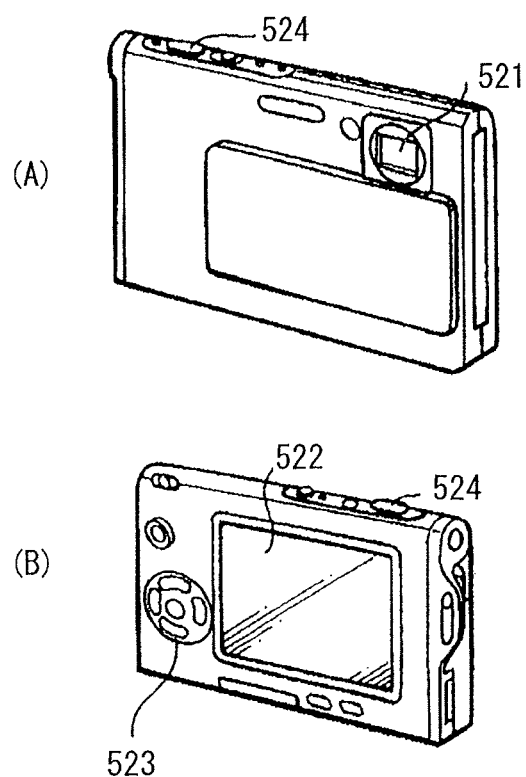
FIG. 17 is a perspective view illustrating an external configuration of Application Example 2.

FIG. 17 illustrates an appearance of a digital camera to which the display according to the above-described respective embodiments is applied. The digital camera has, for example, a light-emitting section for a flash 521, a display section 522, a menu switch 523, and a shutter button 524, and the display section 522 is configured of the display according to the respective embodiments.

Application Example 3

Figure 18:
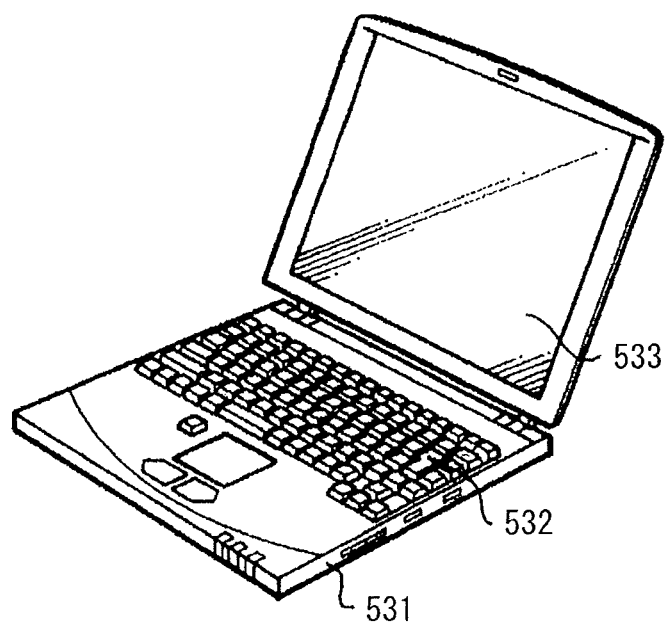
FIG. 18 is a perspective view illustrating an external configuration of Application Example 3.

FIG. 18 illustrates an appearance of a notebook personal computer to which the display according to the above-described respective embodiments is applied. The notebook personal computer has, for example, a main body 531, a keyboard 532 for operation of inputting characters and the like, and a display section 533 for displaying an image, and the display section 533 is configured of the display according to the above-described respective embodiments.

Application Example 4

Figure 19:
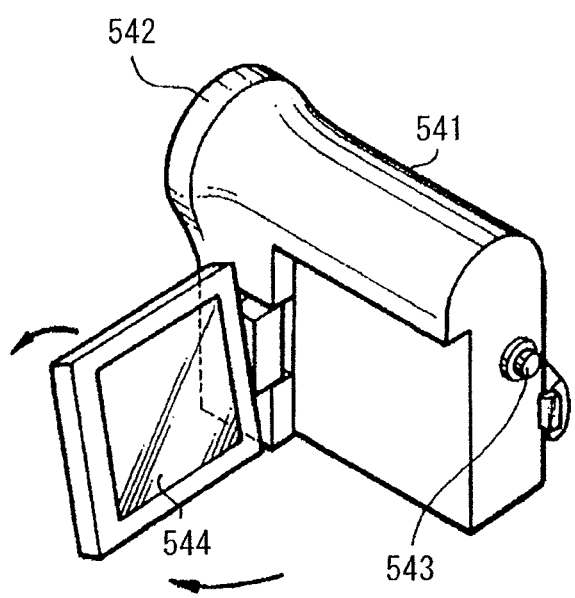
FIG. 19 is a perspective view illustrating an external configuration of Application Example 4.

FIG. 19 illustrates an appearance of a video camera to which the display according to the above-described respective embodiments is applied. The video camera has, for example, a main body 541, a lens for shooting an object 542 arranged on a front surface of the main body 541, a shooting start/stop switch 543, and a display section 544. Then, the display section 544 is configured of the display according to the above-described respective embodiments.

Application Example 5

Figure 20:
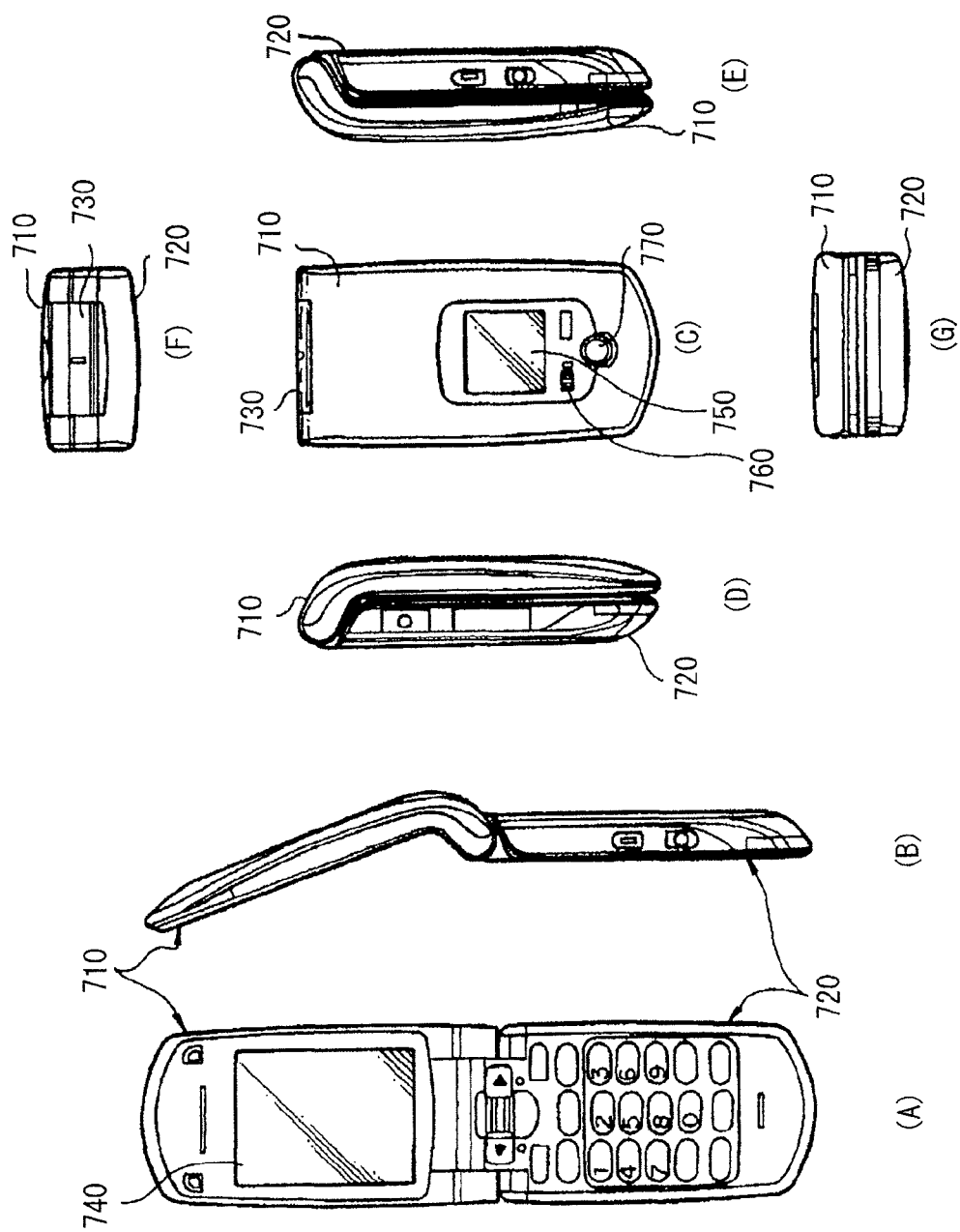
FIG. 20 is a front view, side views, a top view and a bottom view illustrating an external configuration of Application Example 5.

FIG. 20 illustrates appearances of a cellular phone to which the display according to the above-described respective embodiments is applied. The cellular phone is formed by connecting, for example, a top-side enclosure 710 and a bottom-side enclosure 720 to each other by a connection section (hinge section) 730, and the cellular phone has a display 740, a sub-display 750, a picture light 760, and a camera 770. The display 740 or the sub-display 750 is configured of the display according to the above-described respective embodiments.

6. MODIFICATION EXAMPLES

Although the present invention is described referring to some embodiments and the application examples to electronic devices, the invention is not limited thereto, and may be variously modified.

Modification Example 1

In the above-described respective embodiments and the like, the contact type touch sensor is used as the touch sensor; but the touch sensor is not limited thereto. For example, instead of the contact type touch sensor, a capacitive type touch sensor may be used.

Figure 21:
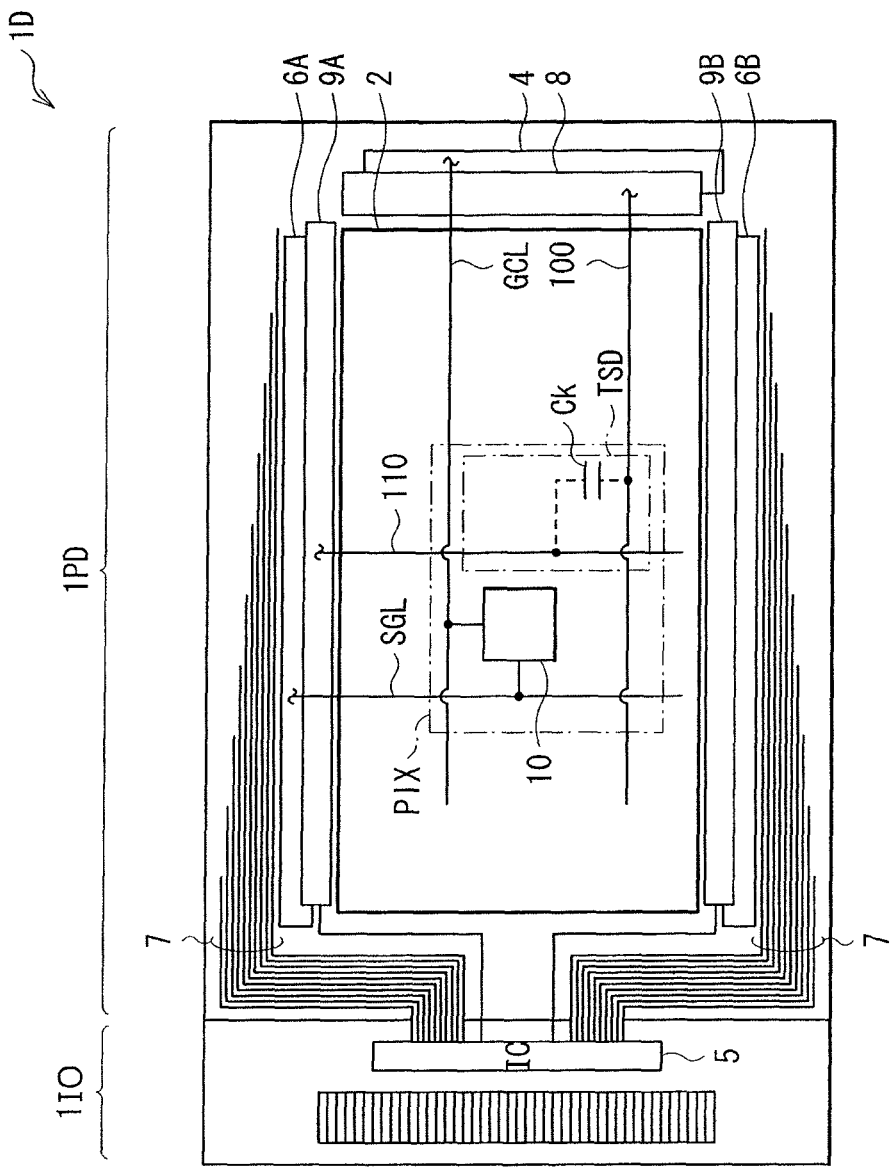
FIG. 21 is a schematic view illustrating a display according to a modification example of the first to third embodiments of the invention.

FIG. 21 illustrates a configuration example of a display including the capacitive type touch sensor. A display 1D includes a display pixel 10 and a capacitive type touch sensor TSD in each pixel PIX. The touch sensor TSD includes a capacitance Ck. The capacitance Ck is formed between a drive electrode 100 and a touch detection electrode 110. Moreover, the drive electrode 100 is connected to a drive electrode driving circuit 8, and the touch detection electrode 110 is connected to a sensor readout circuit 9.

In the case where a drive signal supplied from the drive electrode driving circuit 8 to the drive electrode 100 is transmitted to the touch detection electrode 110 through the capacitance Ck, the touch sensor TSD performs a touch detection operation with use of a change in the transmission amount of the drive signal in response to a touch by an external object.

Unlike the above-described respective embodiments and the like, the display section 2 includes a signal line exclusive to the display operation and a signal line exclusive to the touch detection operation. That is, a display cell 10 performing the display operation is connected to the signal line SGL and the gate control line GCL, and the touch sensor TSD performing the touch detection operation is connected to the touch detection electrode 110 and the drive electrode 100.

Herein, the touch sensor TSD corresponds to a specific example of "capacitive type sensor element" in the invention.

As the sensor readout circuit 9, the same circuit as those used in the above-described first to third embodiments may be used. That is, for example, in the sensor readout circuit 3 according to the first embodiment (refer to FIG. 2), a connection point of the readout switch RSW is changed from the signal line SGL to the touch detection electrode 110, and the comparator 331 is replaced with a detection circuit for detecting a signal from the capacitive type touch sensor TSD according to the modification example, thereby the same effects as those in the above-described embodiments are obtainable.

In addition, in the display 1D, the type of the display cell 10 is not limited, and any type may be used. For example, the display cell 10 may be a display cell using a liquid crystal element, or a display cell using an EL element such as an organic EL element.

Figure 22:
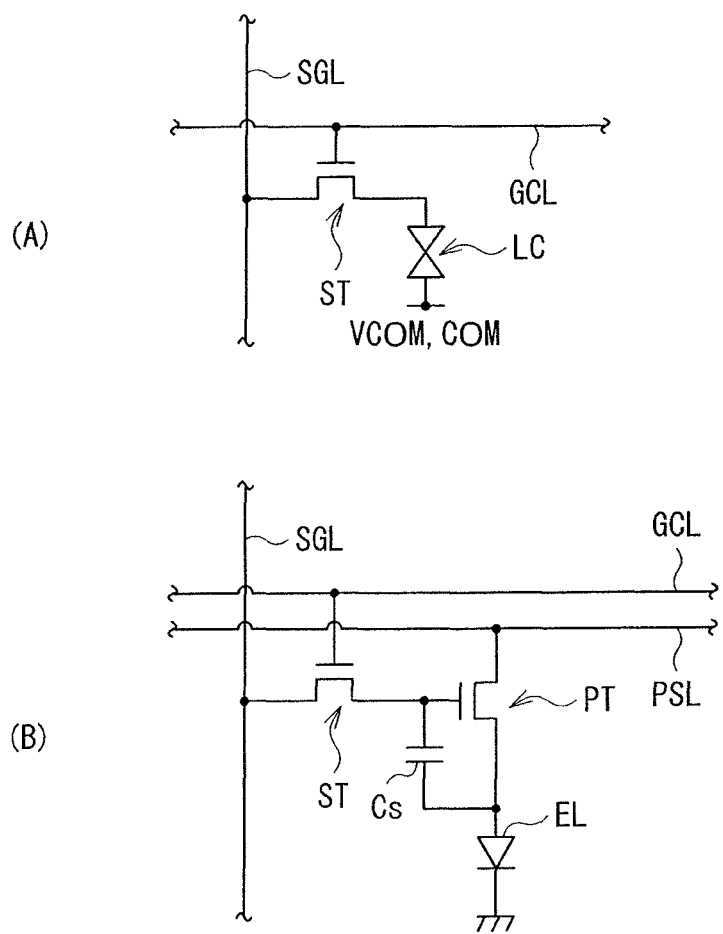
FIG. 22 is a circuit diagram illustrating a configuration example of a display cell illustrated in FIG. 21.

FIG. 22 illustrates a configuration example of the display cell 10, and (A) indicates the case where a liquid crystal element LC is used, and (B) indicates the case where the organic EL element is used.

In the case where the liquid crystal element LC is used as the display cell 10, the liquid crystal element LC is allowed to perform the display operation based on a pixel signal supplied from the pixel electrode through the signal line SGL and the select transistor ST and a drive signal VCOM supplied to a common electrode (the drive electrode 100).

In the case where the organic EL element is used as the display cell 10, first, a pixel signal is supplied to an end of a capacitor Cs through the signal line SGL and the select transistor ST. Then, after the select transistor ST turns off, when a power-supply voltage is supplied to a power supply line PSL, a bias of a transistor PT is set by a bootstrap operation, and the transistor PT functions as a current source feeding a current corresponding to the pixel signal. As a result, the organic EL element EL is allowed to emit light, thereby the display operation is allowed to be performed.

Modification Example 2

Moreover, in the above-described respective embodiments and the like, instead of the contact type touch sensor, an optical type touch sensor may be used.

Figure 23:
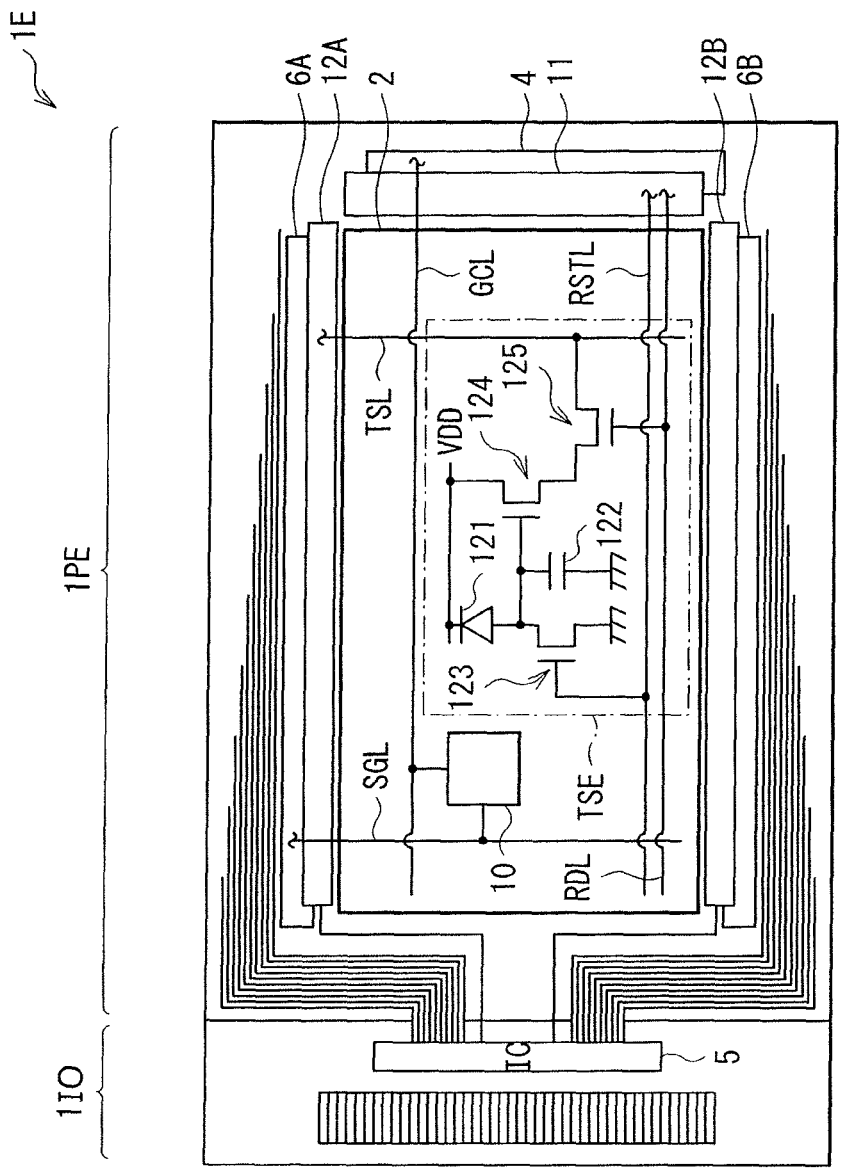
FIG. 23 is a schematic view illustrating a display according to another modification example of the first to third embodiments of the invention.

FIG. 23 illustrates a configuration example of a display including the optical type touch sensor. A display 1E includes an optical type touch sensor TSE. The touch sensor TSE includes a photodiode 121, a capacitive element 122, and transistors 123 to 125. A cathode of the photodiode 121 is connected to a power supply VDD, and an anode of the photodiode 121 is connected to one end of the capacitive element 122. The capacitive element 122 is arranged between the anode of the photodiode 121 and a ground (GND). The transistors 123 to 125 each are configured of, for example, a TFT or the like. In the transistor 123, a drain is connected to the anode of the photodiode 121, and a gate is connected to a reset line RSTL, and a source is connected to the ground (GND). In the transistor 124, a source is connected to the power supply VDD, a gate is connected to the anode of the photodiode 121, and a drain is connected to a source of the transistor 125. Then, in the transistor 125, the source is connected to the drain of the transistor 124, and a gate is connected to a read line RDL, and a drain is connected to a sensor line TSL. The sensor line TSL is connected to sensor readout circuits 12A and 12B. A reset line RSTL and the read line RDL are connected to a sensor drive circuit 11.

By this configuration, first, the transistor 123 turns on by a signal of the reset line RSTL, and the capacitive element 122 is discharged to be reset. Next, the photodiode 121 receives light with a light amount corresponding to detection of an external proximity object, and depending on the light amount, a current is generated from the cathode to the anode, and in an arbitrary period, the capacitive element 122 is charged by the current. Then, when the transistor 125 turns on by the signal of the read line RDL, a voltage corresponding to a voltage on both ends of the charged capacitive element 122 is outputted to the sensor line TSL. The voltage outputted to the sensor line TSL is detected by the sensor readout circuits 12A and 12B, thereby touch detection is allowed.

Herein, the touch sensor TSE corresponds to a specific example of "optical type sensor element" in the invention.

As the sensor readout circuits 12A and 12B, the same circuit as those used in the above-described first to third embodiments may be used. Thereby, the same effects as those in the above-described embodiments are obtainable.

In addition, also in the display 1E, the type of the display cell 10 is not limited, and any type may be used. For example, the display cell 10 may be a display cell using a liquid crystal element (refer to FIG. 22(A)), or a display cell using an EL element such as an organic EL element (refer to FIG. 22(B)).

Other Modification Examples

Moreover, in the above-described embodiments and the like, the output signal of the touch sensor is extracted from the display section with use of the signal line SGL, but the invention is not limited thereto. For example, as illustrated in FIG. 8, a line only for sensor readout (a sensor line) may be arranged to extract the output signal of the touch sensor from the display section. Also in this case, as in the case of the above-described embodiments and the like, high response performance is achievable while reducing power consumption, and downsizing of the display is achievable.

Further, in the above-described third embodiment, the operation frequency is reduced by reducing the frequency of the clock signal (a shift from the normal mode to the non-contact mode A) and further suspending the supply of the clock signal (a shift from the non-contact mode A to the non-contact mode B) to achieve a reduction in power consumption, but the invention is not limited thereto. For example, as illustrated in FIGS. 11 to 13, in the case where the touch detection operation is performed on one in every four touch sensors TS arranged in the horizontal direction of the display section 2 in the non-contact mode A, a method of arranging shift registers of 4 systems is considered. For example, a connection may be made so that outputs from touch sensors TS which are located at every four in the touch sensors TS are supplied to shift registers belonging to the same system. By this configuration, in the normal mode, the shift registers of all 4 systems are allowed to operate, and in the non-contact mode A, the shift registers of only one system selected from all shift registers are allowed to operate. Thereby, the same effects as those in the above-described third embodiment are obtainable. In this case, in the shift from the non-contact mode A to the non-contact mode B, as in the case of the third embodiment, the supply of the clock signal may be suspended intermittently, or the clock frequency may be reduced.

Figure 24:
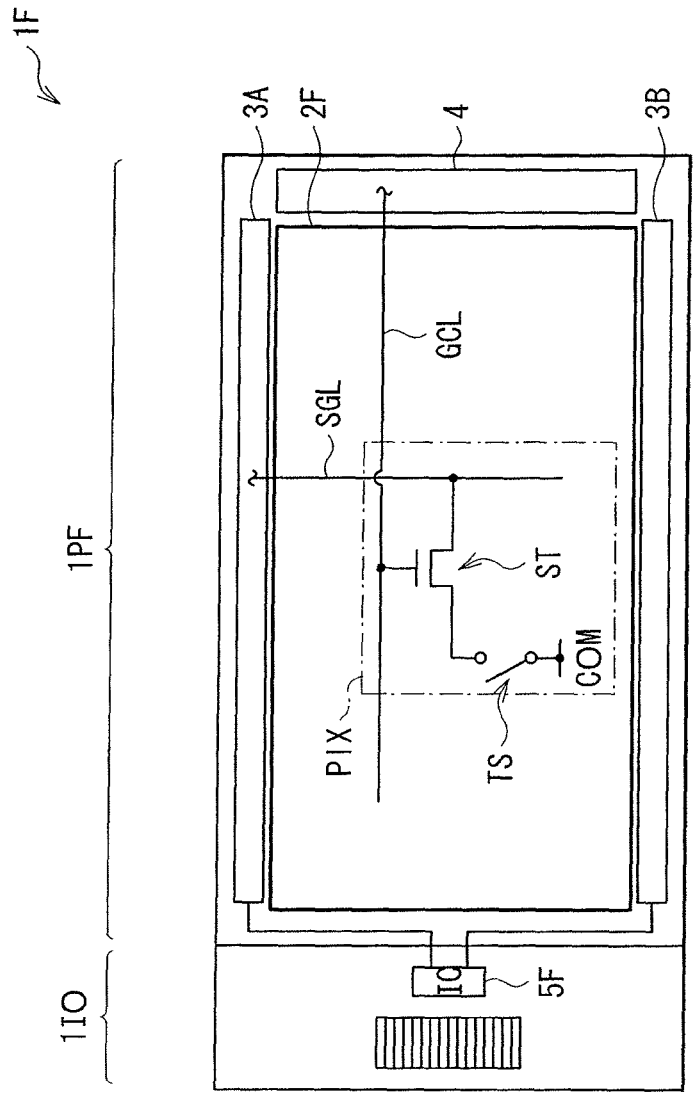
FIG. 24 is a schematic view illustrating a touch panel according to still another modification example of the first to third embodiments of the invention.

Moreover, in the above-described embodiments and the like, the function of the touch panel is included in the display, but the invention is not limited thereto, and as illustrated in FIG. 24, the invention is applicable to a touch panel itself.

The invention claimed is:

1. A display comprising:
a plurality of display elements performing display based on picture signals supplied to a plurality of picture signal lines, respectively;
a plurality of sensor elements outputting touch signals indicating detection of an external proximity object to a plurality of sensor signal lines, respectively;
a plurality of detection sections, each detecting a touch signal from the corresponding sensor signal line;
a transfer output section transferring and outputting a detection result of the detection section to outside; and
a control section controlling operations of the detection section and the transfer output section, allowing the transfer output section to operate in a case where the touch signal is detected in any of the detection sections, and suspending an operation of the transfer output section in a case where the touch signal is not detected,
wherein the transfer output section includes a shift register having a plurality of flip-flops each holding and outputting an output value of the corresponding detection section, the shift register performing a parallel-serial conversion of the detection result by using the flip-flops, and
the control section includes a plurality of switches, each of which independently connects an enabling voltage to a transfer clock control circuit for allowing the shift-register to perform the parallel-serial conversion, depending upon the output value output from the corresponding flip-flop for each of the switches.

2. The display according to claim 1, wherein
the detection section divides a whole touch detection region where the plurality of sensor elements are arranged into a plurality of regions, and sequentially detects the touch signal from one of the regions to another in a time-divisional manner, and
the control section suspends the operation of the transfer output section in a period corresponding to a region, where the touch signal is not detected, in the plurality of regions.

3. The display according to claim 2, wherein
the plurality of sensor elements are arranged in a matrix form in a horizontal direction and a vertical direction in the touch detection region, and the region includes a plurality of sensor elements arranged in the horizontal direction.

4. The display according to claim 1, wherein
the control section suspends a part of a detection operation of the detection section as well when the touch signal is not detected in the detection section for a predetermined period.

5. The display according to claim 1, wherein
the detection section detects each of the touch signals through sampling with a predetermined frequency, and
the control section reduces an operation frequency in the detection section and the transfer output section when the touch signal is not detected in the detection section for a predetermined period.

6. The display according to claim 5, wherein the control section counts number of frames for the display, and reduces an operation frequency in the detection section and the transfer output section when the touch signal is not detected in the detection section for a period of one or more frames, and when the touch signal is detected after that, the control section resets a number count value in a count operation and puts the reduced operation frequency back to original operation frequency.

7. The display according to claim 6, wherein the control section shifts to a first operation mode in a case where the touch signal is not detected in the detection section in a period of one or more frames, and the control section shifts to a second operation mode in a case where the touch signal is detected thereafter, the first operation mode allowing the detection section and the transfer output section to operate at every predetermined number of frames, the second operation mode allowing the detection section and the transfer output section to operate at every frame.

8. The display according to claim 1, wherein
the sensor signal lines are used as the picture signal lines, as well,
the display includes an initialization section simultaneously applying an initialization signal to all of the plurality of sensor signal lines in an initialization period, and
the detection section detects the touch signal in a period other than a picture signal application period, where the picture signals are applied to the sensor signal lines, in a period following the initialization period.

9. The display according to claim 8, wherein
the control section includes:
a control signal generation section generating an activation signal when the touch signal is detected in the detection section and generating a stop signal when an initialization signal by the initialization section is applied, and an operation signal control section controlling the generation of a transfer clock signal to be supplied to the transfer output section and a detection activation signal to be supplied to the detection section in response to the activation signal and the stop signal, and further wherein the initialization signal that is supplied by the initialization section is applied in every initialization period with a predetermined interval.

10. The display according to claim 8, wherein
a DC signal having a constantly fixed voltage level is used as the initialization signal.

11. The display according to claim 8, wherein
the display element is a liquid crystal display element including:
a pixel electrode to which the picture signal is supplied,
a drive electrode to which a common signal is supplied, the common signal being commonly supplied to the plurality of display elements, and
a liquid crystal layer driven in response to a potential difference between a voltage of the pixel electrode and a voltage of the drive electrode,
the sensor element is a contact type sensor element configured of the pixel electrode and the drive electrode, and
the detection section detects a voltage change as the touch signal in the sensor signal line occurring when the pixel electrode and the drive electrode comes close to or in contact with each other by being pressed by an external proximity object.

12. The display according to claim 11, wherein
the liquid crystal display element is driven in a manner of a polarity inversion drive where the polarity of the potential difference is inverted at every predetermined period,
a signal based on the common signal having potential which changing at every predetermined period above-mentioned is used as the initialization signal, and
a logic gate circuit is inserted between the detection section and the control signal generation section, the logic gate circuit generating an effective logic of a detection result of the detection section based on the initialization signal and outputting the effective logic to the control signal generation section.

13. The display according to claim 1, wherein
the sensor element is a capacitive type sensor element including an electrode which forms a capacitance and outputting a signal to the sensor signal line based on the capacitance which changes depending on an external proximity object.

14. The display according to claim 1, wherein
the sensor element is an optical type sensor element including a photosensitive element which detects light and outputs a signal according to an amount of the light, and outputting a signal to the sensor signal line based on an output signal from the photosensitive element, the output signal changing depending on an external proximity object.

15. The display according to claim 1, wherein
the display element is an EL display element.

16. A touch panel comprising:
a plurality of sensor elements outputting touch signals indicating detection of an external proximity object to a plurality of sensor signal lines, respectively;
a plurality of detection sections each detecting a touch signal from the corresponding sensor line;
a transfer output section transferring and outputting a detection result of the detection section to outside; and
a control section controlling operations of the detection section and the transfer output section, allowing the transfer output section to operate in a case where the touch signal is detected in any of the detection sections, and suspending an operation of the transfer output section in a case where the touch signal is not detected,
wherein the transfer output section includes a shift register having a plurality of flip-flops each holding and outputting an output value of the corresponding detection section, the shift register performing a parallel-serial conversion of the detection result by using the flip-flops, and
the control section includes a plurality of switches, each of which independently connects an enabling voltage to a transfer clock control circuit for allowing the shift-register to perform the parallel-serial conversion, depending upon the output value output from the corresponding flip-flop for each of the switches.

17. The display according to claim 16, wherein
the transfer output section converts the detection result of the detection section from parallel data to serial data, and transfers and outputs the detection result.

18. An electronic device comprising:
a display having a touch sensor function of detecting an external proximity object; and
a processing section performing a predetermined process based on information inputted by the touch sensor function,
wherein the display includes:
a plurality of display elements performing display based on picture signals supplied to a plurality of picture signal lines, respectively,
a plurality of sensor elements outputting touch signals indicating detection of an external proximity object to a plurality of sensor signal lines, respectively,
a plurality of detection sections each detecting a touch signal from the corresponding sensor signal line,
a transfer output section transferring and outputting a detection result of the detection section to outside, and
a control section controlling operations of the detection section and the transfer output section, allowing the transfer output section to operate in a case where the touch signal is detected in any of the detection sections, and suspending an operation of the transfer output section in a case where the touch signal is not detected,
wherein the transfer output section includes a shift register having a plurality of flip-flops each holding and outputting an output value of the corresponding detection section, the shift register performing a parallel-serial conversion of the detection result by using the flip-flops, and
the control section includes a plurality of switches, each of which independently connects an enabling voltage to a transfer clock control circuit for allowing the shift-register to perform the parallel-serial conversion, depending upon the output value output from the corresponding flip-flop for each of the switches.

19. An electronic device comprising;
a touch panel detecting an external proximity object; and
a processing section performing a predetermined process based on information inputted by the touch panel,
wherein the touch panel includes:
a plurality of sensor elements outputting touch signals indicating detection of an external proximity object to a plurality of sensor signal lines, respectively,
a plurality of detection sections each detecting a touch signal from the corresponding sensor signal line,
a transfer output section transferring and outputting a detection result of the detection section to outside, and
a control section controlling operations of the detection section and the transfer output section, allowing the transfer output section to operate in a case where the touch signal is detected in any of the detection sections, and suspending an operation of the transfer output section in a case where the touch signal is not detected,
wherein the transfer output section includes a shift register having a plurality of flip-flops each holding and outputting an output value of the corresponding detection section, the shift register performing a parallel-serial conversion of the detection result by using the flip-flops, and
the control section includes a plurality of switches, each of which independently connects an enabling voltage to a transfer clock control circuit for allowing the shift-register to perform the parallel-serial conversion, depending upon the output value output from the corresponding flip-flop for each of the switches.

\* \* \* \* \*